(12) United States Patent
Schwenker et al.

(10) Patent No.: US 12,517,689 B2
(45) Date of Patent: Jan. 6, 2026

(54) DETECTION OF INAPPROPRIATE LANGUAGE AND/OR IMAGERY FOR PREVENTION OF DISPLAY ON QUICK SERVICE RESTAURANT SIGNAGE

(71) Applicant: Insight Direct USA, Inc., Chandler, AZ (US)

(72) Inventors: Andrew Schwenker, Mahomet, IL (US); Antoine E. Hall, Spring Hope, NC (US); Ilya Eliashevsky, Milford, CT (US); Ryan Miller, Columbus, OH (US); Tony Lunt, Union, KY (US)

(73) Assignee: Insight Direct USA, Inc., Chandler, AZ (US)

( * ) Notice: Subject to any disclaimer, the term of this patent is extended or adjusted under 35 U.S.C. 154(b) by 197 days.

(21) Appl. No.: 18/374,464

(22) Filed: Sep. 28, 2023

(65) Prior Publication Data

US 2024/0118852 A1    Apr. 11, 2024

Related U.S. Application Data

(60) Provisional application No. 63/414,064, filed on Oct. 7, 2022.

(51) Int. Cl.
| | |
|---|---|
| G06F 3/14 | (2006.01) |
| G06F 40/20 | (2020.01) |
| G06Q 50/12 | (2012.01) |
| G06V 10/774 | (2022.01) |
| G06V 30/10 | (2022.01) |
| G09F 9/30 | (2006.01) |

(52) U.S. Cl.
CPC .............. *G06F 3/14* (2013.01); *G06F 40/20* (2020.01); *G06Q 50/12* (2013.01); *G06V 10/774* (2022.01); *G06V 30/10* (2022.01); *G09F 9/30* (2013.01); *G06V 2201/09* (2022.01)

(58) Field of Classification Search
CPC .......... G06F 3/14; G06F 40/20; G06V 30/10; G06V 10/774; G06V 2201/09; G06Q 50/12; G09F 9/30
See application file for complete search history.

(56) References Cited

U.S. PATENT DOCUMENTS

| | | |
|---|---|---|
| 4,245,720 A | 1/1981 | Neill |
| 5,279,392 A | 1/1994 | Casale et al. |
| 6,574,603 B1 | 6/2003 | Dickson et al. |

(Continued)

FOREIGN PATENT DOCUMENTS

| | | |
|---|---|---|
| EP | 2551809 A1 | 1/2013 |
| JP | 3493332 B2 | 2/2004 |

*Primary Examiner* — Ming Shui
(74) *Attorney, Agent, or Firm* — Kinney & Lange, P.A.

(57) ABSTRACT

A method of detecting inappropriate imagery in a customer user profile image intending to be displayed on digital signage at a quick service restaurant can include identifying the presence of a customer adjacent a digital sign; associating the customer with a customer user profile; analyzing, by a computer processor, the customer user profile image for inappropriate imagery in the customer user profile image; in response to the detection of inappropriate imagery, displaying on the digital sign either no image or a different image that does not contain inappropriate imagery; and, in response to the detection of inappropriate imagery, displaying on the digital sign the customer user profile image.

18 Claims, 13 Drawing Sheets

(56) References Cited

U.S. PATENT DOCUMENTS

| | | | |
|---|---|---|---|
| 7,992,355 | B2 | 8/2011 | Bridgman et al. |
| 9,875,472 | B2 | 1/2018 | Granbery |
| 9,904,903 | B1 | 2/2018 | Weiss |
| 10,304,147 | B2 | 5/2019 | Kelly et al. |
| 10,467,559 | B1 | 11/2019 | Svenson et al. |
| 10,719,897 | B2 | 7/2020 | Becker et al. |
| 10,783,447 | B2 * | 9/2020 | Kochura ............... G06Q 50/01 |
| 10,943,311 | B1 | 3/2021 | Svenson et al. |
| 11,097,937 | B2 | 8/2021 | Burks et al. |
| 11,227,347 | B2 | 1/2022 | Mylonas |
| 11,443,260 | B1 | 9/2022 | Van Breen |
| 2003/0018531 | A1 | 1/2003 | Mahaffy et al. |
| 2003/0195821 | A1 * | 10/2003 | Kennamer ........... G06Q 10/087 705/64 |
| 2004/0230496 | A1 | 11/2004 | Neuman et al. |
| 2006/0178943 | A1 | 8/2006 | Rollinson |
| 2006/0218039 | A1 | 9/2006 | Johnson |
| 2007/0208626 | A1 | 9/2007 | Awiszus |
| 2009/0048890 | A1 | 2/2009 | Burgh |
| 2009/0255195 | A1 | 10/2009 | Bridgman et al. |
| 2014/0249938 | A1 | 9/2014 | Garrett |
| 2016/0244311 | A1 | 8/2016 | Burks et al. |
| 2018/0025445 | A1 | 1/2018 | Becker et al. |
| 2018/0122022 | A1 | 5/2018 | Kelly et al. |
| 2018/0197163 | A1 | 7/2018 | Kelly et al. |
| 2018/0253805 | A1 | 9/2018 | Kelly |
| 2019/0122248 | A1 * | 4/2019 | Panigrahi ............. G06V 40/173 |
| 2019/0279181 | A1 | 9/2019 | Kelly |
| 2019/0339672 | A1 | 11/2019 | Bancroft |
| 2021/0275928 | A1 * | 9/2021 | Ashoori .................. A63F 13/79 |
| 2021/0297807 | A1 | 9/2021 | Brady |
| 2021/0390613 | A1 | 12/2021 | Becker et al. |
| 2022/0101288 | A1 | 3/2022 | Georgiadis |
| 2022/0237713 | A1 | 7/2022 | Rosas-Maxemin et al. |
| 2022/0292259 | A1 | 9/2022 | Carpenter et al. |
| 2022/0292618 | A1 | 9/2022 | Desantola et al. |
| 2023/0169612 | A1 | 6/2023 | Liguori et al. |

\* cited by examiner

DETECTION OF INAPPROPRIATE LANGUAGE AND/OR IMAGERY FOR PREVENTION OF DISPLAY ON QUICK SERVICE RESTAURANT SIGNAGE

CROSS-REFERENCE TO RELATED APPLICATIONS

This application is a nonprovisional application claiming the benefit of U.S. provisional application Ser. No. 63/414,064, filed on Oct. 7, 2022, entitled "DETECTION OF INAPPROPRIATE LANGUAGE AND/OR IMAGERY FOR PREVENTION OF DISPLAY ON QUICK SERVICE RESTAURANT SIGNAGE" by Andrew Schwenker, Antoine Hall, Ryan Miller, Tony Lunt, and Ilya Eliashevsky.

FIELD OF THE INVENTION

The disclosure relates generally to order preparation in a business, such as a quick service restaurant (e.g., a fast-food restaurant) and, more specifically, to systems and methods for customer management and order preparation and delivery optimization.

BACKGROUND

A business, such as a quick service restaurant (e.g., a fast-food restaurant), sets itself apart from other restaurants by being able to prepare orders of food items quickly and properly such that the order is fresh and complete when a customer is ready to pick the order up (e.g., when the quick service restaurant is ready to deliver/present the order to the customer). However, various factors can result in a customer's order failing to be ready in a timely manner or failing to be fresh by being prepared too far in advance of delivery/presentation to the customer. The quick service restaurant (also referred to herein as the "QSR") can fail to deliver/present the order to the customer if the QSR is too busy to prepare the order fast enough. The QSR can deliver/present the order to the wrong customer, slowing down the delivery to the correct customer. If the customer ordered by phone, online, or by mobile application (e.g., a phone app), the order may be ready well before the customer arrives at the QSR to pick the order up, resulting in one or multiple food items of the order no longer being fresh.

SUMMARY

This disclosure presents a method of detecting inappropriate imagery in a includes receiving customer information including the customer user profile image, and analyzing the customer user profile by a computer processor for inappropriate imagery. In response to the detection of inappropriate imagery, either no image or a different image (not containing inappropriate imagery) is displayed on the digital sign. In response to the determination that the customer user profile image contains no inappropriate imagery, the customer user profile mage id displayed on the digital sign.

This disclosure also presents a system for detecting inappropriate imagery. This system includes a digital sign, customer information, and a computer processor. The digital sign is associated with a business and configured to display a customer user profile image. The customer information includes the customer user profile image provided by a customer associated with the customer information. The computer processor is configured to receive the customer information and analyze the customer user profile image for inappropriate imagery. In response to the detection of inappropriate imagery in the customer user profile image, the computer processor does not instruct the digital sign to display the customer user profile image. In response to a determination that the customer user profile image contains no inappropriate imagery, the computer processor instructs the digital sign to display the customer user profile image.

The present summary is provided only by way of example, and not limitation.

Other aspects of the present disclosure will be appreciated in view of the entirety of the present disclosure, including the entire text, claims, and accompanying figures.

Figure 1A:
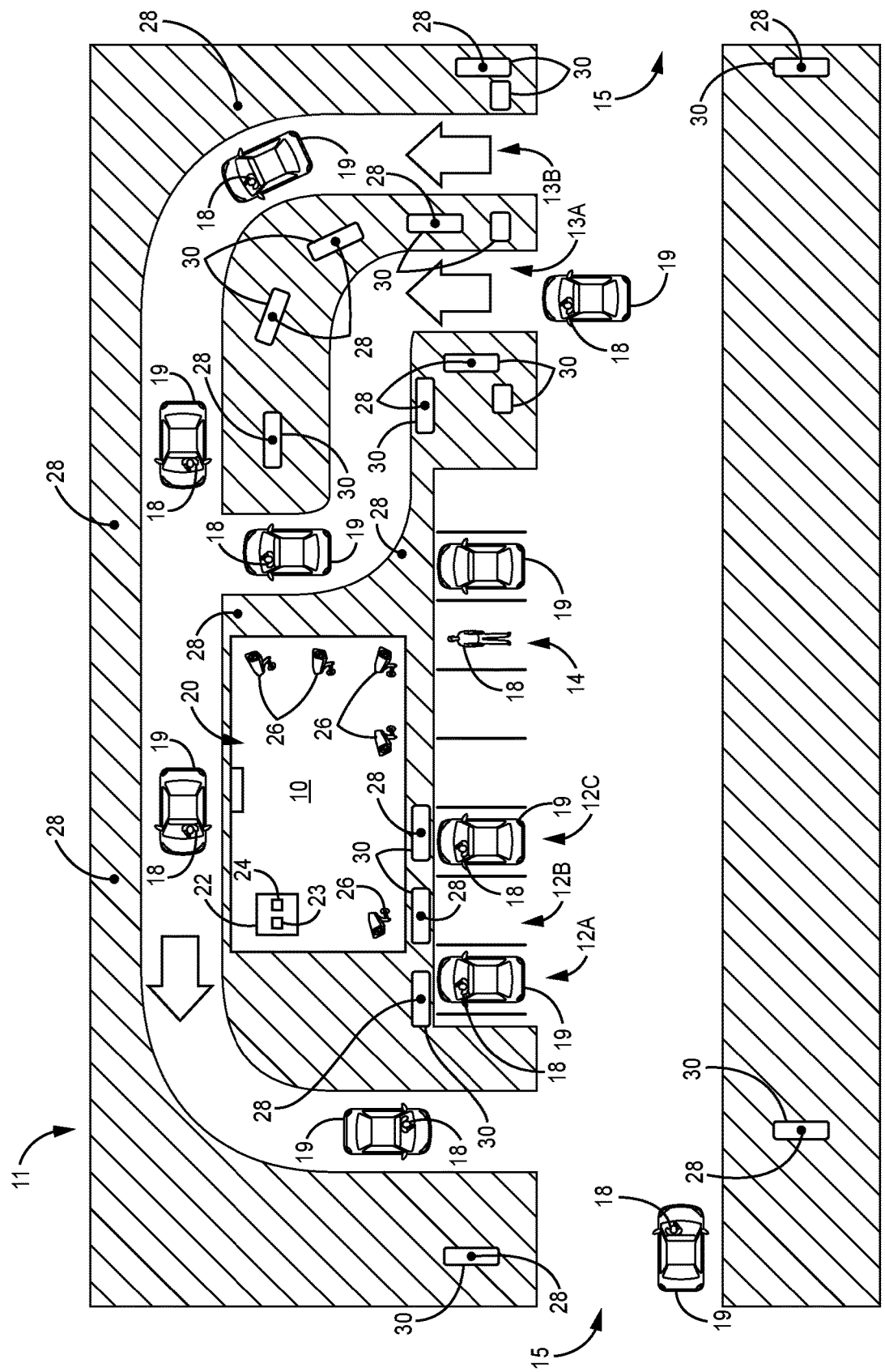
FIG. 1A is a plan view of a quick service restaurant and surrounding parking lot having an example of a customer management and order preparation and delivery optimization system.

While the above-identified figures set forth one or more examples of the present disclosure, other examples/embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and examples of the present invention may include features and components not specifically shown in the drawings.

DETAILED DESCRIPTION

Systems and related methods are disclosed herein for use in association with a business, such as a quick service restaurant (also referred to herein as a "QSR"), to quickly deliver freshly prepared orders to multiple customers while reducing wait times and, if desired, prioritizing loyalty customers (e.g., customers that have signed up to a loyalty program or QSR specific mobile application). The systems and methods can be directed at customer management and order preparation and delivery optimization. While this disclosure describes the systems and methods as used with a QSR, the disclosed systems and methods can be used with other businesses, types of stores, etc. for preparing and delivering orders placed by customers both in store (e.g., in person) and distant from the business (e.g., via telephone communication, an internet website, and/or a mobile phone application).

As QSRs and other stores look to provide a more personalized experience with their loyal customers, they may wish to display user profile images of customers on digital store signage. Some such approaches could enable customers to upload any photo to be displayed on the digital signs. This disclosure presents a system capable of recognizing any inappropriate, profane, or obscene user profile language and/or imagery and preventing that language or imagery from being displayed on the digital signage.

Currently, when dealing with applications which make use of profile photos, users are free to upload whatever language and/or image they choose. When the language and/or photos are available publicly (i.e., social media, forums, etc.), it is up to outside individuals to report the profile photos and/or language as being inappropriate. Once the reporting occurs, moderators determine whether photos and/or language meet the guidelines for being inappropriate/profane. Such approaches rely on lengthy reporting processes that can take days before any action is taken.

The systems disclosed below can use a machine-learning model to analyze photos and/or language and determine if the photos and/or language fall into the guidelines of being inappropriate. If a profile photo and/or language is determined to be inappropriate, the system can elect not to display the photos and/or language, otherwise the profile photo and/or language is displayed as desired.

Machine-learning (ML) can be used to recognize inappropriate/profane images/language and block them from being displayed. More specifically, this system can include a model that is trained to identify inappropriate/profane images and/or language. Prior to displaying images on digital signage, the trained model makes a determination as to whether it is appropriate to do so.

Advantageously, the system described herein leverages ML to allow obscene or otherwise undesirable messages or images to be excluded from digital signage immediately, even across very large numbers of potential customers.

The disclosed systems and methods are described herein with regards to the nonlimiting examples shown in FIGS. 1A-8. FIG. 1A is a plan view of QSR 10 having customer management and order preparation and delivery system 20 (also referred to herein as "system 20"). FIG. 1B is a plan view of QSR 10 and surrounding roads 16. FIG. 1C is a perspective view of entrances to drive-through lanes 13A and 13B of QSR 10 from inside vehicle 19 of customer 18 with customer 18 having mobile application 34 on customer mobile phone 48. FIG. 1D is a plan view of drive-through lanes 13A and 13B of QSR 10 having beacons 28 for determining the location of the customers.

Figure 1B:
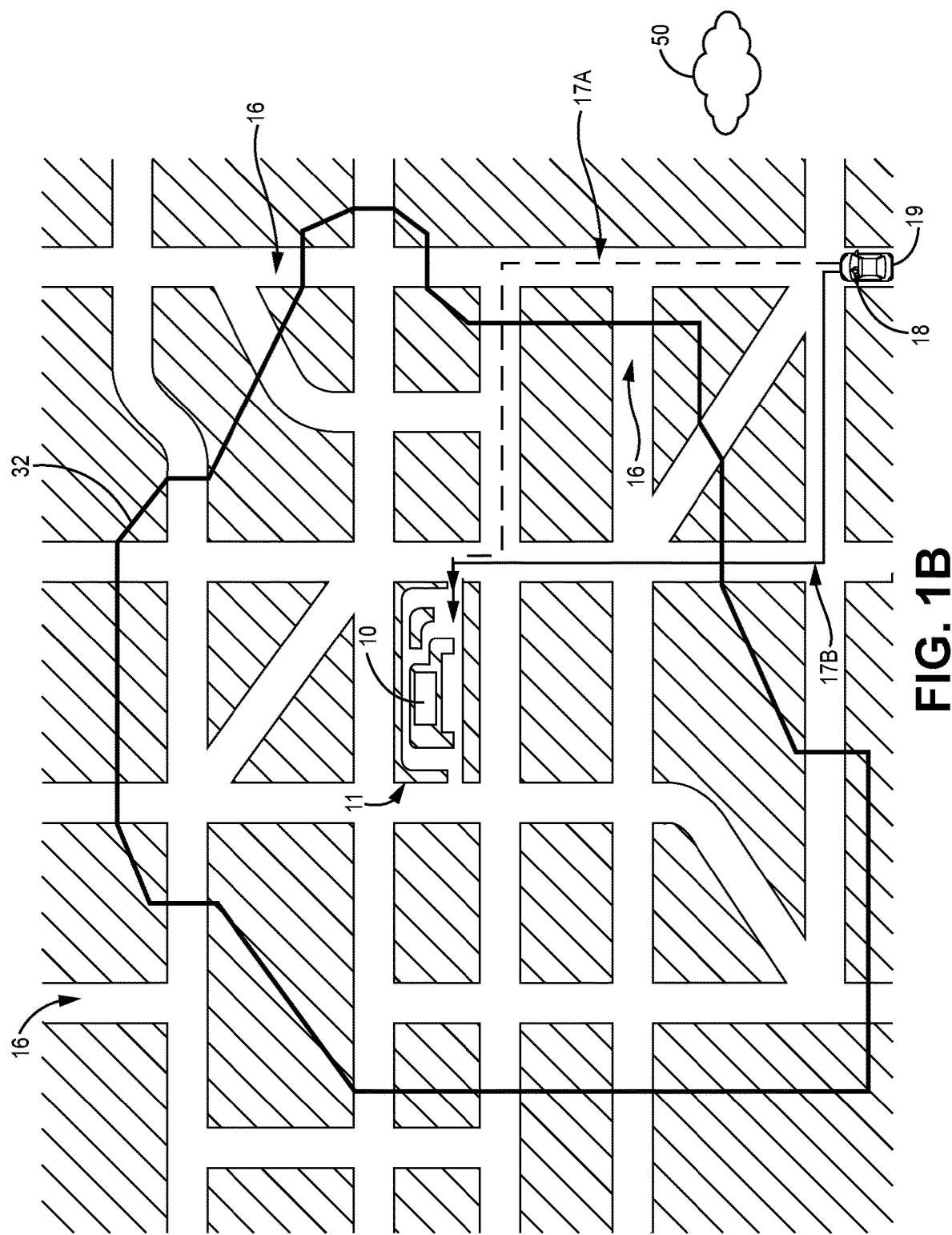
FIG. 1B is an example of a plan view of the quick service restaurant and surrounding roads having a geofence for each order of each customer.

QSR 10 includes parking lot 11 surrounding QSR 10. Parking lot 11 can include parking spots 12A, 12B, and 12C; drive-through lanes 13A and 13B; general parking spots 14; entrances/exits 15; and other roads surrounding QSR 10 as accessed by entrances/exits 15 as shown in FIG. 1A. Parking lot 11 can also be referred to simply as the zone surrounding QSR 10. Also within parking lot 11 can be numerous customers 18 within vehicle 19 or outside of vehicles 19. Shown in FIG. 1B is QSR 10 and roads 16 around QSR 10. Customer 18 in vehicle 19 can be provided proposed customer route 17A by mobile application 34, which is associated with QSR 10, on customer mobile phone 48. Customer 18 in vehicle 19 can take actual customer route 17 B to get to QSR 10. Also shown in FIG. 1B is geofence 32, which can be created and positioned by system 20 for each customer 18 depending on an order placed by customer 18 and fulfilled by QSR 10. While this disclosure describes vehicle 19 as belonging to customer 18, vehicle 19 can merely be associated with customer 18 such that customer 18 can travel to and/or arrive at QSR 10 via vehicle 19.

System 20 can include computer processor 22 (which can include machine-learning model 23, storage media 24, and/or other components/capabilities), cameras 26, beacons 28, signs 30, geofence 32, mobile application 34 (on customer mobile phone 48), and location tracker 50 (shown in FIG. 1B). Mobile application 34, as described with regards to FIG. 2C, can include customer user profile 36. Customer user profile 36 can include customer name 38, customer picture 40, customer vehicle information 42, customer vehicle license plate information 44, and payment information 46.

QSR 10 can be any business that accepts orders from customers 18, whether in person or distant from QSR 10, and prepares those orders for delivery to/pick-up by customers 18 (e.g., giving the order to customer 18 in person when customer 18 arrives at QSR 10). QSR 10 can be, for example, a quick service restaurant (e.g., a fast food restaurant) that is configured to accept orders from customers 18 distant from QSR 10 via mobile application 34, a website on the internet, telephone, or other means understood by one of skill in the art. Additionally, QSR 10 can accept orders from customers 18 in person with customers 18 being within drive-through lanes 13A and 13B, at parking spots 12A-12C, within QSR 10 at an order terminal, and/or via other means. QSR 10 is described herein as containing system 20, but all or some components of system 20 can be distant from QSR 10 and/or in communication with QSR 10. For example, system 20 can be located at a corporate headquarters or another hub to which QSR 10 is a franchisee. Additionally, QSR 10 can include other components not expressly disclosed herein, such as automated order preparation (e.g., an automated system for preparing food items for the orders), automated systems for receiving orders (e.g., an order terminal that requires no QSR staff/employees), and other components. QSR 10 can include various components for receiving customer 18 orders and delivering orders, such as one or multiple drive-through windows that allow for the taking of orders and the handing of orders to customers 18, wired or wireless communication with customers 18 in drive-through lanes 13A and 13B, wired or wireless communication with customers 18 in parking spots 12A-12C, and other components. QSR 10 can also include one or multiple cameras 26 on, within, affixed, or otherwise associated with QSR 10 to collect video data of customers 18, vehicles 19, and/or other elements within parking lot 11 for use by system 10.

Parking lot 11 can surround QSR 10. Parking lot 11 is a zone that can include areas for vehicles 19 to drive to and away from QSR 10 (such as entrances/exits 15). Parking lot 11 can also include areas for vehicles 19 to park and/or drive to order and/or receive orders placed by customers 18 (such as parking spots 12A, 12B, and 12C; drive-through lanes 13A and 13B; and/or general parking spots 14). Parking lot 11 can also include customers 18 approaching/arriving at QSR 10 by foot. Within parking lot 11 can be various components of system 20 to aid in customer management and order preparation and delivery optimization. As described in more detail below, parking lot 11 can include one or multiple cameras 26, beacons 28, and/or signs 30. As shown in FIG. 1A, parking lot 11 can also have customers 18 and/or vehicles 19 therein.

While shown in FIG. 1A as having three parking spots 12A-12C, two drive-through lanes 13A and 13B, multiple general parking spots 14, and two entrances/exits 15, parking lot 11 can have none or any number of those areas for customer 18 and/or vehicles 19. For example, QSR 10 can have only one drive-through lane, no specific parking spots, only a few general parking spots, and one entrance/exit. In another example, QSR 10 can be organized to have a "drive-in" configuration with no drive-through lanes and many specific parking spots within which vehicles 19 are positioned to order and collect/receive the orders.

The disclosed methods and systems 20 can include other steps, components, configurations, and/or features not expressly disclosed herein that are suitable for customer management and order preparation and delivery optimization. For example, the methods and systems can include additional computer processors, user interfaces, storage media, cloud-based computing and/or storage, cloud-based location tracking and traffic monitoring, and/or communication device(s) for viewing, sending, receiving, and storing information electronically. In another example, the methods and systems can include traffic-control components, such as traffic lights, non-digital/electronic signs, and other elements. Other configurations can include robotics/automation and/or other systems and/or methods for delivering orders from inside QSR 10 to vehicles/customers exterior to QSR 10.

System 20 can include computer processor 22, which can be an edge gateway/device within and/or in communication with QSR 10. FIG. 1A shows computer processor 22 as a module on top of QSR 10. However, this is for representation, and computer processor 22 can be located anywhere within, outside, or distant from QSR 10. In one example, computer processor 22 is located within a server room or office of QSR 10. In another example, computer processor 22 is located distant from QSR 10, such as within the cloud and/or at a corporate headquarters which QSR 10 is a franchisee. Computer processor 22 can be configured to receive information from QSR 10, employees/staff members of QSR 10, any components of system 20, a tracking/traffic system distant from system 10 (e.g., Google Maps, Apple Maps, Bing Maps), and/or other sources in communication with computer processor 22. Computer processor 22 can be configured to give and/or perform instructions and/or analysis to arrive at a course of action that will deliver improved customer management/direction and order preparation and delivery optimization (e.g., the preparation and delivery of orders as quickly as possible).

As described below, system 20 can include one or multiple computer processors 22 having any hardware and/or software, such as computer vision, optical character recognition, and/or one or multiple machine-learning models 23, for managing customers 18 (e.g., optimally directing customers 18/vehicles 19 to locations surrounding QSR 10 to reduce wait times) and optimizing the preparation and delivery of the orders by customers 18. Computer processor 22 can be designed/organized in any configuration to perform the functions described herein.

Computer processor 22 can include one or multiple computer/data processors. In general, the computer/data processors can include any or more than one of a processor, a microprocessor, a controller, a digital signal processor (DSP), an application specific integrated circuit (ASIC), a field-programmable gate array (FPGA), or other equivalent discrete or integrated logic circuitry. Computer processor 22 can perform instructions stored within storage media 24 (or located elsewhere), and computer processor 22 can include storage media 24 such that computer processor 22 is an all-encompassing component able to store instructions and perform the functions described herein. Additionally, computer processor 22 can perform other computing processes described herein as merely being performed by system 20.

System 20 (including computer processor 22) can also include or function in association with machine-readable storage media 24. In some examples, a machine-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media can be entirely or in part a temporary memory, meaning that a primary purpose storage media is not long-term storage. Storage media, in some examples, is described as volatile memory, meaning that the memory, does not maintain stored contents when power to the system (or the component(s) where storage media are located) is turned off. Examples of volatile memories can include random access memories (RAM), dynamic random-access memories (DRAM), static random-access memories (SRAM), and other forms of volatile memories. In some examples, storage media can also include one or more machine-readable storage media. Storage media can be configured to store larger amounts of information than volatile memory. Storage media can further be configured for long-term storage of information. In some examples, storage media include non-volatile storage elements. Examples of such non-volatile storage elements can include magnetic hard discs, optical discs, flash memories and other forms of solid-state memory, or forms of electrically programmable memories (EPROM) or electrically erasable and programmable (EEPROM) memories. Most generally, storage media 24 is machine-readable data storage capable of housing stored data from a stored data archive. Storage media 24 can be configured handle any digital/electronic storage needs for system 20 and/or QSR 10 or multiple QSRs 10 (e.g., in a chain/franchise).

System 20 can include one or multiple machine-learning models 23 (either as a separate component and/or within computer processor 22). Machine-learning models 23 can be trained using inputs, such as information regarding the orders by customers 18 as well as conditioned of QSR 10, and outputs, such as the actual amount of time taken to prepare the orders (e.g., the individual food items in the orders). This information can be collected/recorded by system 20 during operation prior to the training of machine-learning models 23. The inputs can be, but are not limited to, the food items (e.g., a hamburger, French fries, a strawberry milkshake) in the orders, a time-of-day that the orders were placed by each customer 18, a number of employees/staff members on duty at QSR 10 when the order is received, which employees/staff members are on duty at QSR 10 when the order is received (e.g., James is currently on duty and Jared is not on duty), a number of orders currently pending at QSR 10 when each order is received, an amount of ingredients in inventory necessary to prepare the order, and other information and conditions of QSR 10. The outputs can be, but are not limited to, the actual amount of time taken by QSR 10 to prepare each order placed by customers 18. The actual amount of time can be measured, for example, from when the order is received to when the final food item in the order is completed, from when the order is placed to when the order with all completed food items comes into possession by customer 18 (e.g., is handed/delivered to customer 18), or another way of measurement.

Machine-learning models 23 can perform various techniques to create an algorithm (or multiple algorithms) or otherwise determine which inputs are most indicative of predicting the outputs. These techniques can include classification techniques (e.g., support vector machines, discriminant analysis, naïve bayes, nearest neighbor), regression techniques (e.g., linear regression, GLM, SVR, GPR, ensemble methods, decision trees, neural networks), clustering (e.g., K-means, K-medoids, fuzzy C-means, hierarchical, Gaussian mixture, neural networks, hidden Markov models), and/or other techniques. The machine-learning models 23 can weight the importance of each input using coefficients that are increased and/or decreased to refine machine-learning models 23. Other techniques and/or methods of training machine-learning models 23 can be used by system 20 (or by other components distinct from system 20 responsible for training machine-learning models 23) to train machine-learning models 23.

Once trained, machine-learning models 23 can receive the inputs described above and predict, for example, the amount of time taken by QSR 10 to prepare each order. The predicted time needed for preparation/completion of the orders can then be used by system 20 and QSR 10 for customer 18 management (e.g., directing customers 18 to locations/positions to collect orders) and order preparation and optimization (e.g., preparing food items in each order at specific times so that the orders are ready when customers 18 arrive at QSR 10 but the food items are still fresh/warm). While in operation, machine-learning models 23 can receive additional data sets (e.g., inputs/information regarding previous orders) as well as the actual amount of time needed to complete preparation of the orders to use in further refining/training machine-learning models 23. This additional refining/training can be done in real time as the previous inputs and outputs are determined and provided to machine-learning models 23. The additional refining/training can improve the accuracy of predictions by machine-learning models 23 regarding the amount of time taken by QSR 10 to complete preparation of orders by customers 18.

Figure 1C:
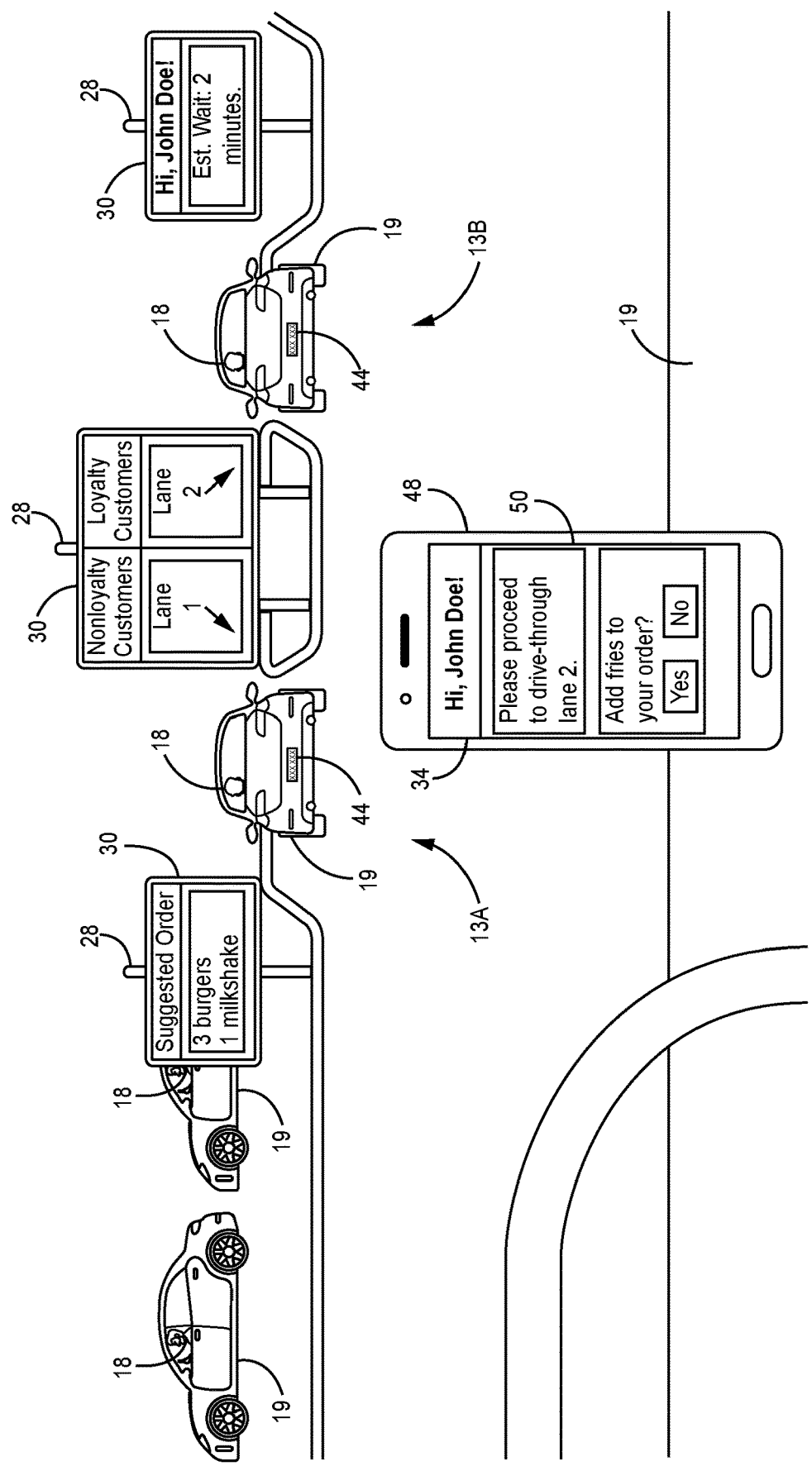
FIG. 1C is an example of a perspective view of entrances to the drive-through lanes of the quick service restaurant from inside a vehicle of the customer having a mobile application on a mobile phone.
Figure 1D:
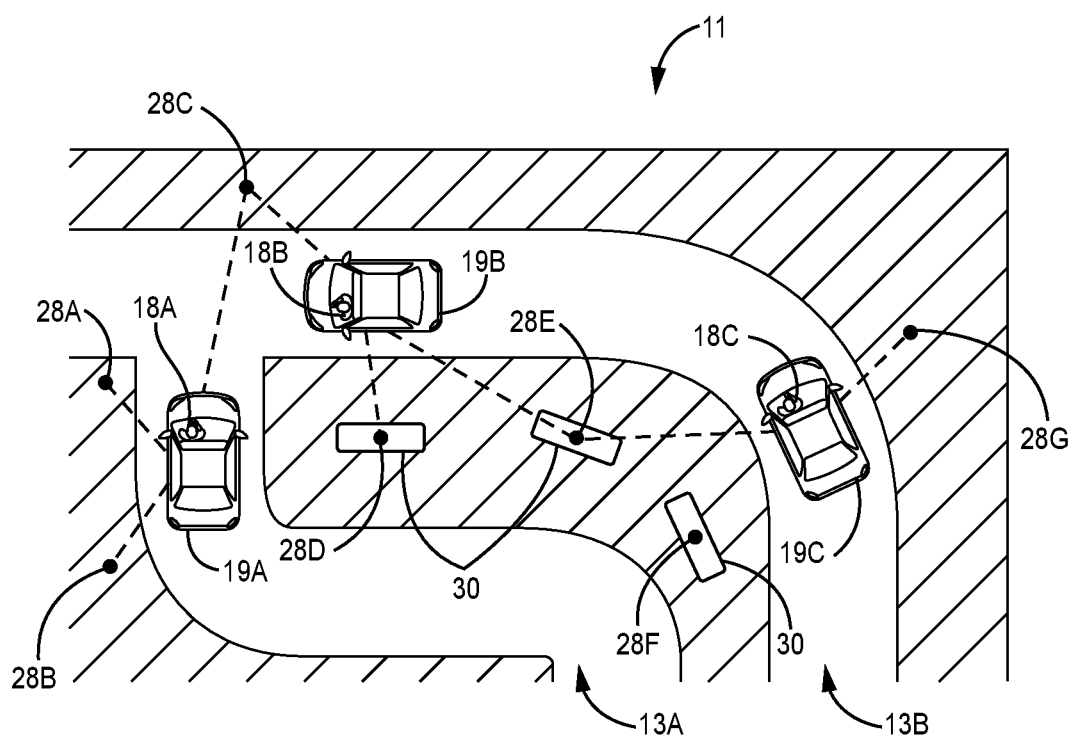
FIG. 1D is an example of a plan view of the drive-through lanes of the quick service restaurants having beacons for determining the location of the customers.
Figure 1E:
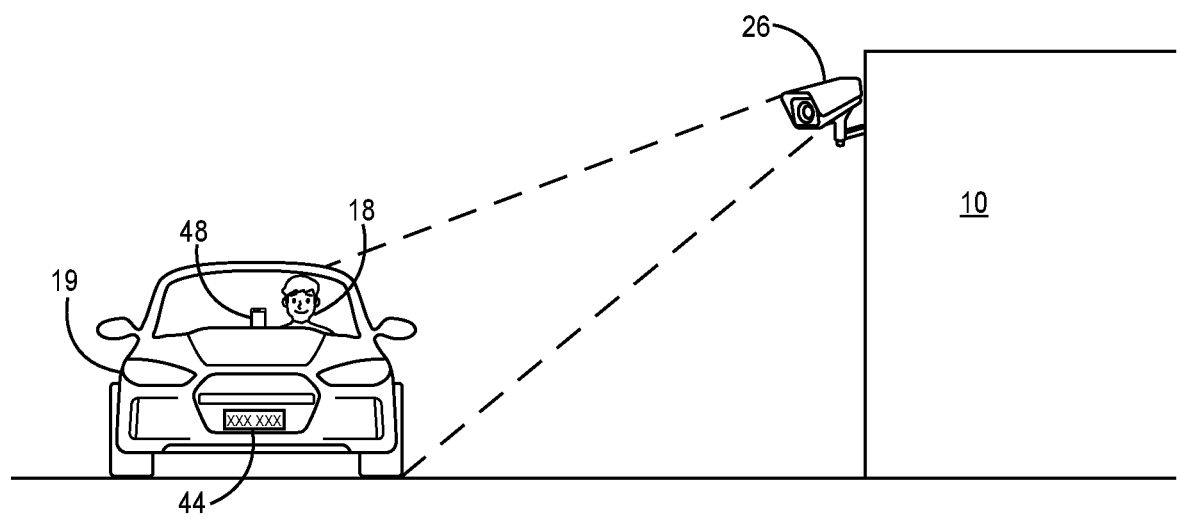
FIG. 1E is an example of a front view showing a customer in a vehicle entering the parking lot of the quick service restaurant.

Cameras 26, shown in FIGS. 1A and 1E, of system 20 collect video data that can include customers 18 and/or vehicles 19 and transmit/send the video data to computer processor 22 for identification of customers 18 and/or vehicles 19. Cameras 26 can be on, within, affixed to, or otherwise associated with QSR 10 to collect video data. In one example, cameras 26 are on top of signs 30. In another example, cameras 26 can be on top of or otherwise affixed to light poles configured to illuminate parking lot 11 of QSR 10. Cameras 26, while described and shown herein as having more than one camera, can have any number of cameras suitable for providing information to system 10 regarding customers 18 and/or vehicles 19 (e.g., vehicle identification information, location information, etc.). In one example, system 20 can include only one camera 26, while other examples can include multiple cameras 26, such as one camera 26 collecting video data of each of parking spots 12A, 12B, and 12C; drive-through lanes 13A and 13B; and entrances/exits 15. As shown in FIG. 1A, one camera 26 is pointed at (e.g., collect video data with a field of view that includes) each of entrances/exits 15, one camera 26 is pointed at each of drive through lanes 13A and 13B, and one camera 26 is pointed at the totality of parking spots 12A, 12B, and 12C.

Cameras 26 collect video data of customers 18 and/or vehicles 19. Cameras 26 can be in wired or wireless communication with the other components of system 20, including computer processor 22, to relay the video data to computer processor 22. Cameras 26 can work in conjunction with computer processor 22, which can have computer vision and/or optical character recognition, to identify vehicles 19 by, for example, collecting license plate numbers from vehicles 19 (as is shown in FIG. 1E). Computer processor 22 can extract the license plate number of vehicle 19 from the video data. The license plate number can then be associated with customer 18 via customer vehicle license plate information 44 in customer user profile 36 (shown in FIG. 2C). The information in customer user profile 36, such as customer vehicle license plate information 44, can be provided by customer 18 (e.g., entered by customer 18 into customer user profile 36 using mobile application 34). Additionally, the information in customer user profile 36 can be collected by system 20 and added to customer user profile 36 automatically. For example, customer 18 in vehicle 19 can proceed through drive-through 13A and collect his/her order. Cameras 26 can collect video data that includes vehicle 19 from that customer 18, and computer processor 22 can extract license plate number information 44. System 20 can then add vehicle license plate information 44 to customer user profile 36 for use later when customer 18 visits QSR 10 again in vehicle 19. In such an example, no information identifying vehicle 19 is required to be provided by customer 18 (such as a license plate number) to link/associate customer 18 with vehicle 19 for later/repeat visits by customer 18 to QSR 10. Other information can be collected about vehicle 19 from the video data and used to associate vehicle 19 with customer 18, such as the make, model, and color of vehicle 19. This information can be collected, associated with customer 18, and/or entered/found as customer vehicle information 42 in customer user profile 36.

Cameras 26, computer processor 22, and system 20 as a whole can use video data to identify vehicles 19 and associate a specific vehicle 19 with a specific customer 18 using other methods. In one example, video data collected by cameras 26 can be used in conjunction with location tracker 50 on (or associated with) mobile application 34 on customer mobile phone 48. System 20 can identify/associate a location of customer 18 with a location of vehicle 19 shown in video data of camera 26. In such an example, no information identifying vehicle 19 is needed (such as a license plate number) to link/associate customer 18 with vehicle 19 the first time customer 18 visits QSR 10.

Cameras 26 can include other capabilities, such as for identification of customers 18 that are on foot or otherwise not within vehicles 19. In one example, cameras 26 along with computer processor 22 can identify a face of customer 18 and compare the face to customer picture 40 of customer user profile 36 to associate customer 18 with customer user profile 36. In another example, the face of customer 18 collected by cameras 26 can be added to customer user profile 36 by system 20 without the need for customer 18 to provide customer picture 40. Cameras 26 can include other capabilities and functions not expressly disclosed herein for customer management and order preparation and delivery optimization.

Beacons 28, as shown in FIGS. 1A and 1D, of system 20 are each configured to transmit a specific signal to a receiver (such as customer mobile phone 48) associated with customer 18 for use in determining a location of customer 18 within parking lot 11. Beacons 28 can be on, within, affixed to, or otherwise associated with QSR 10. In one example, beacons 28 are located throughout parking lot 11. As shown in FIG. 1A, a number of beacons 28 are at a similar location to a number of signs 30, respectively (e.g., are on, within, or otherwise associated with signs 30), while other beacons 30 are stand-alone components distant from signs 30 and other components of system 20. System 20 can include any number of beacons 28 (and some examples can include configurations that include no beacons 28), including one beacon 28, two beacons 28, or more than two beacons 28. Beacons 28 can be located so as to be adjacent/near any positions where vehicles 19 may be within parking lot 11. In one example, beacons 28 are near/along drive-through lanes 13A and 13B, near/adjacent entrances/exits 15, and near/adjacent parking spots 12A, 12B, and 12C.

An example process for determining a location of customer 18 within vehicle 19 is described below with regards to FIG. 1D. Each of beacons 28A-28G transmit a specific, unique signal that is different from other signals. The signal can be any type of transmission that can be received by a receiver, such as customer mobile phone 48. For example, the signal can use low-energy short-range technology, such as a low-energy Bluetooth signal. In other examples, beacons 28A-28G can transmit signals over a wireless fidelity (WiFi) or telephone network. The signal transmitted by each of beacons 28A-28G can be received by customer mobile phone 48 (having mobile application 34) associated with customers 18A-18C (e.g., being on or near customers 18A-18C). In this example shown in FIG. 1D, mobile applications 34 of customers 18A-18C can receive (by customer mobile phone 48) the signals from any of beacons 28A-28G and record timestamps reflective of the times the signals were received. Mobile application 34 can then communicate to computer processor 22 via wired or wireless communication) notification of reception of each signal received by mobile application 34 as well as the timestamps reflective of the time each signal was received. Computer processor 22 can triangulate the location of customer mobile phone 48 and, therefore, customers 18A-18C (assuming customer 18 is near customer mobile phone 48) from the known location of each of beacons 28A-28G, the time that the signal was sent out from each of beacons 28A-28G, and the timestamp reflective of when each signal was received by customers 18A-18C from each of beacons 28A-28G. Computer processor 22 can determine the distance each customer mobile phone 48 (and thus each customer 18A-18C) is from each of beacons 28A-28G and, from this information, triangulate the location of each of customers 18A-18C.

System 20 may only need signals from two beacons 28A-28G to determine the location of customers 18A-18C. In FIG. 1D, customer 18A in vehicle 19A receives signals from only beacons 28A, 28B, and 28C. These signals (and corresponding timestamps) are communicated by mobile application 34 to computer processor 22 of system 20, and computer processor 22 determines that mobile application 34 of customer 18A is located near the end of drive-through lane 13A. Similarly, customer 18B in vehicle 19B is receives signals from only beacons 28C, 28D, and 28E. These signals (and corresponding timestamps) are communicated to computer processor 22 of system 20, and computer processor 22 determines that mobile application 34 of customer 18B is located near the end of drive-through lane 13B. Finally, in the example in FIG. 1D, customer 18C in vehicle 19C receives signals from beacons 28F and 28G. These signals (and corresponding timestamps) are communicated to computer processor 22 of system 20, and computer processor 22 determines that mobile application 34 of customer 18C is located near the beginning of drive-through lane 13B. With the location of customers 18A-18C known, system 20 can (among other capabilities) display customer specific information on signs 30 and optimize the preparation of orders so that orders are ready when customers 18 reach a delivery window and/or parking spots 12A, 12B, and 12C.

System 20 can also include one or multiple signs 30 for displaying information regarding customers 18 and/or QSR 10. Signs 30 are shown in FIGS. 1A, 1C, 1D, and 3A-3C. Signs 30 can each be a digital/electronic sign/display in communication with computer processor 22, with each of signs 30 being configured to receive, from computer processor 22, instructions/images/information to display. Signs 30 can be fully or partially digital with a display that is able to change depending on, for example, the customer 18 that is adjacent sign 30 (e.g., customer 18 that can view sign 30). Signs 30 can be any type of digital display, such as a LCD screen, a LED screen, a projection screen, or another configuration suitable for displaying information, images, etc. that is viewable by customers 18 both within and outside of vehicles 19 any time-of-day and during any weather. Signs 30 can be located in QSR 10, on top of or on the sides of QSR 10, and/or anywhere within parking lot 11. In the example shown in FIG. 1A, signs 30 are shown in front of each parking spot 12A, 12B, and 12C; at the entrances to each of drive-through lanes 13A and 13B, at various locations along each of drive-through lanes 13A and 13B that are likely to be adjacent to stopped/waiting vehicles 19; and at entrances/exits 15 to parking lot 11. In other examples, signs 30 can be at other locations, such as on the outside walls of QSR 10, in front of and/or adjacent to general parking spots 14, and facing outwards from parking lot 11. Additionally, signs 30 can be multiple-sided so as to have an electronic display on multiple sides of signs 30 to display information, images, etc. in numerous directions.

Signs 30 can have any size suitable for viewing by customers 18. For example, signs 30 at entrances/exits 15 may be larger than signs 30 along drive-through lanes 13A and 13B to allow for viewability by customer 18 in vehicles 19 traveling faster through entrances/exits 15 than customers 18 traveling slower through drive-through lanes 13A and 13B. In another example, the first signs 30 along drive-through lanes 13A and 13B (closer to the entrances to drive-through lanes 13A and 13B) may be larger than other signs 30 along drive-through lanes 13A and 13B to show the menu of food items available to be ordered at QSR 10, the food items on the pending order by customer 18, and other information while other signs 30 along drive-through lanes 13A and 13B may be used only to display the estimated wait time until customer 18 receives his/her order (and/or proceeds to the delivery window of QSR 10) so those signs 30 may not need to be as large as other signs 30. In other words, signs 30 can be located anywhere within or near QSR 10 and/or parking lot 11 and can have any sizes, types, configurations, and capabilities to display information regarding QSR 10 and/or customers 18.

Figure 3A:
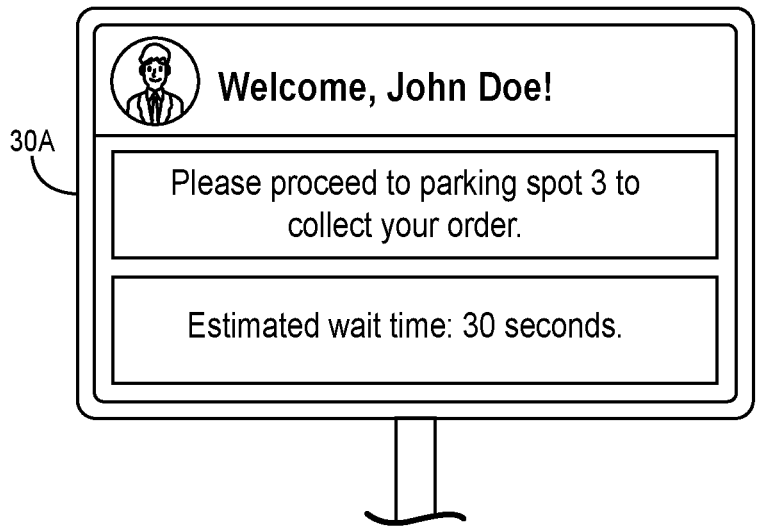
FIGS. 3A and 3B are examples of the digital signs used in displaying information regarding the quick service restaurant and/or information specific to the customer.

FIG. 3A shows one example of sign 30A displaying a welcome to customer 18 (e.g., John Doe) to notify that specific customer 18 that the display is directed at him/her.

Sign 30A in FIG. 3A can be located, for example, at entrance/exit 15 to direct customer 18 to a particular location to wait for the order of customer 18 to be delivered (e.g., direct John Doe to parking spot 3 to collect his order). Finally, sign 30A in FIG. 3A shows customer 18 the estimated wait time until he/she will receive his/her order, which in this example is 30 seconds.

Figure 3B:
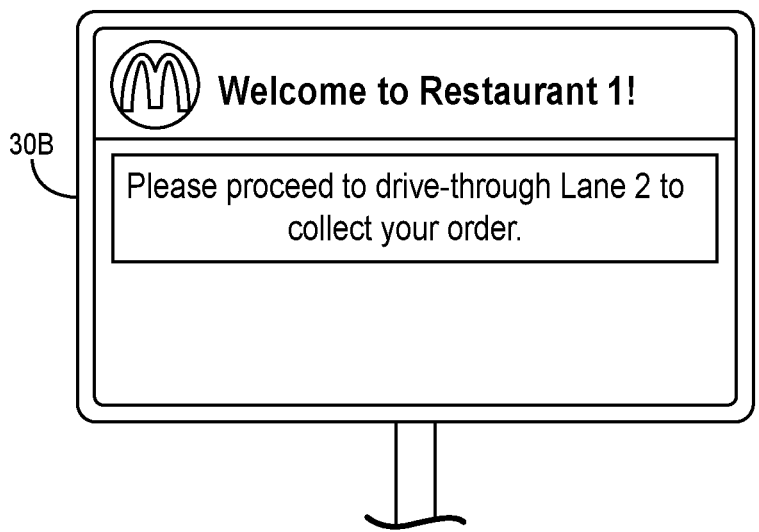

FIG. 3B shows another example of sign 30B displaying information. In this example, the welcome to customer 18 is in the form of a welcome to QSR 10 (e.g., welcome to Restaurant 1). This welcome can also display a logo of QSR 10 or another image relevant to and/or specified by QSR 10 as well as the name of QSR 10 (e.g., Restaurant 1). Other welcomes can include other information about QSR 10. Sign 30B in FIG. 3B can direct customer 18 to a particular location to collect the order (e.g., direct customer 18 to drive-through lane 2 to collect the order). Sign 30B can be located at entrance/exit 15 or, depending on the configuration of drive-through lanes 13A and 13B, near an entrance to the drive-through lanes.

Figure 3C:
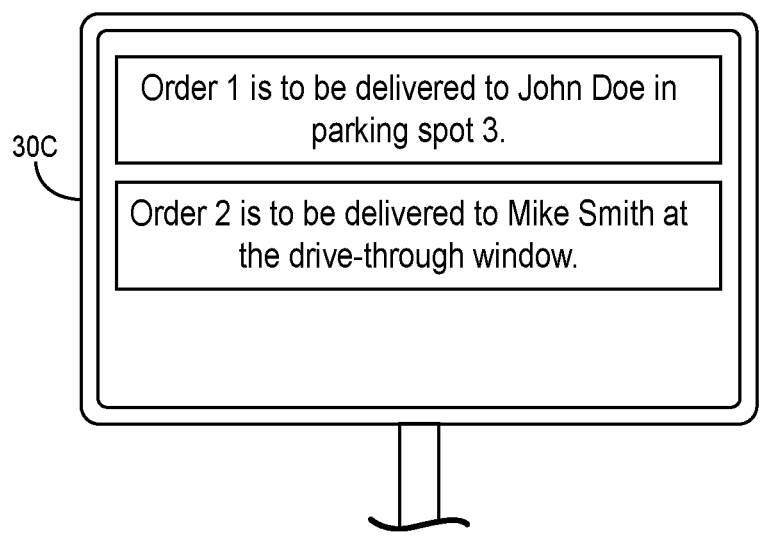
FIG. 3C is an example of a digital sign within the quick service restaurant displaying the location of customers to which employees can deliver the orders.

FIG. 3C shows another example of sign 30C displaying information as to locations where orders by customers 18 are to be delivered within parking lot 11. Sign 30C can be located within QSR 10 and viewable by employees/staff members of QSR 10 so employees/staff members are aware of where customers 18 are and where the orders of customers 18 are to be delivered (e.g., handing the order to John Doe in parking spot 3 or handing another order to Mike Smith at the drive-through window).

Signs 30 can have other sizes, orientations, configurations, capabilities, and/or functions not expressly disclosed herein to display information regarding QSR 10, customers 18, the orders by customers 18, and any other relevant information.

An example of geofence 32 is shown in FIG. 1B. System 20 (computer processor 22) can position geofence 32 surrounding QSR 10 for use in determining when system 20 should begin preparation (or prompt an employee/staff member of QSR 10 to begin preparation) of an order placed by customer 18 distant from QSR 10. Geofence 32 is a virtual geographic boundary placed by system 20 that, when crossed by customer 18 on the way to QSR 10, triggers the beginning of preparation of the order of customer 18 by QSR 10 to ensure preparation of the order is completed by the time customer 18 arrives at QSR 10 while also ensuring that the order is not completed too far in advance so as to no longer be fresh when customer 18 arrives and the order is delivered/given to customer 18. System 20 can place one geofence 32 for each customer 18 that placed an order distant to QSR 10 and must travel to QSR 10 to collect the order. System 20 can be configured to handle the placement of multiple geofences 32 for multiple customer 18.

System 20 placing geofence 32 must receive at least period information regarding the location of customer 18, which can be provided by location tracker 50 associated with mobile application 34 on customer mobile phone 48. Location tracker 50 is shown in FIG. 1B as being a cloud-based system. Location tracker 50 can be part of or work in conjunction with an online maps website, such as Google Maps, Apple Maps, and Bing Maps. System 20, including computer processor 22, can be in wired or wireless communication with location tracker 50 to receive information regarding the location of customer 18.

The placement of geofence 32 is dependent upon at least the amount of time needed to prepare the order (e.g., the at least one food item in the order), and the amount of time needed to prepare the order can be determined by computer processor 22. The placement of geofence 32 can also be dependent on other factors, such as traffic information on roads 16 between customer 18 and QSR 10. The traffic information can be received by computer processor 22 from, for example, an online maps website, such as Google Maps, Apple Maps, and Bing Maps.

Additionally, the placement of geofence 32 can be dependent upon previous driving behavior of customer 18 during previous orders. The previous driving behavior of customer 18 can be stored by system 20 and can include an origin of customer 18 (the location from which customer 18 begins the route to QSR 10), a route the customer takes to QSR 10 from the origin, an average time customer 18 takes to travel from the origin to QSR 10, the likelihood that customer 18 will stop along the way to QSR 10, and other information. Additionally, the placement of geofence 32 is dependent upon any of the factors described above that can increase or decrease the amount of time needed to prepare the order, such as the type of food items in the order, the time-of-day that the order was placed by customer 18, the number of pending orders at QSR 10, the number of employees/staff members on duty at QSR 10, which employees/staff members are on duty at QSR 10 when the order is received, an amount of ingredients in inventory necessary to prepare the order, and other information and conditions of QSR 10.

System 20 can reposition geofence 32 depending on changes to the factors from which the placement of geofence 32 depends, such as an increase or decrease in traffic, deviation from a proposed/quickest route 17A (e.g., a route proposed to customer 18 on mobile application 34 that is determined to be the quickest and/or easiest route) between customer 18 and QSR 10, and/or other factors. System 20 can be configured to provide to customer 18 on mobile application 34 a proposed route 17A to take to QSR 10 that is the least amount of time as compared to other routes. The proposed route 17a, including directions, can be displayed on mobile application 34 on customer mobile phone 48 as shown in FIG. 2B.

System 20 can, in response to customer 18 crossing geofence 32 and QSR 10 beginning preparation of the food items in the order, notify the customer via mobile application 34 that preparation has begun on the order. Additionally, system 20 can provide an estimate of the amount of time until preparation of the order is complete and the order is ready for pick up by customer 18. System 20 can also be configured to reallocate food items in the order by customer 18 if customer 18 crosses back over geofence 32 (e.g., starts heading away from QSR 10), and can restart preparation of the order in response to customer 18 recrossing geofence 32.

Mobile application 34 can be a telephone application, website of QSR 10, or other hardware and/or software configured to allow for customer 18 to place an order from QSR 10. Mobile application 34 is in wired or wireless communication with system 20, including computer processor 22, to transmit and receive information. Mobile application 34 can be on customer mobile phone 48, can provide information regarding the position of customer mobile phone 48 and, assuming customer mobile phone 48 is on or in possession of customer 18, can provide the position of customer 18. Customer mobile phone 48 is described herein as being associated with customer 18 in that customer mobile phone 48 moves in unison with and/or is otherwise under the control of customer 18. Mobile application 34 can be associated with only one QSR 10 or can be associated with a company/franchise to which QSR 10 belongs with the orders being placed at the specific QSR 10 with the closest location to customer 18. Mobile application 34 can be available for download by customer 18 at an online application store or otherwise available to customer 18 through various means known to one of skill in the art.

Mobile application 34 has many capabilities and functions described throughout this disclosure and can have more that are not expressly disclosed herein. Examples of information stored/found on and capabilities of mobile application 34 are shown with regards to FIGS. 1C and 2A-2D and described herein. Mobile application 34 can have any user interface and provide for any interactions between customer 18 and QSR 10, including those not shown or described herein. The user interface shown in FIGS. 1C and 2A-2D is by way of example only and is not limiting, and other mobile applications 34 can have other configurations, user interfaces, capabilities, and functions.

Mobile application 34 can allow for customer 18 to place an order of one or multiple items, including food items, from QSR 10 from a location distant from QSR 10. Mobile application 34 can be configured to allow for customer 18 (e.g., John Doe) to sign up to mobile application 34 to become a loyalty customer having customer user profile 36. Once signed up and having customer user profile 36, mobile application 34 can allow for customer 18 to log in to customer user profile 36 to access the capabilities and functions of mobile application 34. Mobile application 34 can provide a greeting to customer 34 (e.g., John Doe in FIGS. 1C and 2A-2D) and notifications as to the order, the estimated time until the order is ready (e.g., preparation of the order has completed), information that preparation of the order has started and/or is complete, and other information.

Further, as described above, mobile application 34 can provide directions to customer 18 as to a proposed route to take to get to QSR 10. The determination of the proposed/suggested route can depend upon the location of customer 18 as known/determined by location tracker 50 and relayed/transmitted/received by computer processor 22, traffic information on roads 16 between customer 18 and QSR 10, and/or other information. As shown in FIG. 1C, mobile application 34 can provide directions to customer 18 when customer 18 is within or approaching parking lot 11, such as which drive-through lane 13A or 13B to proceed into and/or which parking spot 12A, 12B, or 12C to proceed to for collection/delivery of the order. Additionally, as shown in FIG. 1C, mobile application 34 can suggest items for a not-yet-placed order by customer 18 or suggest items to add to an already placed order by customer 18. The suggested order can be dependent on a variety of factors, including previous orders made by customer 18. For example, if customer 18 usually French fries as part of his/her previous orders, mobile application 34 can suggest to customer 18 to add on fries if the current order does not already include fries.

Figure 2A:
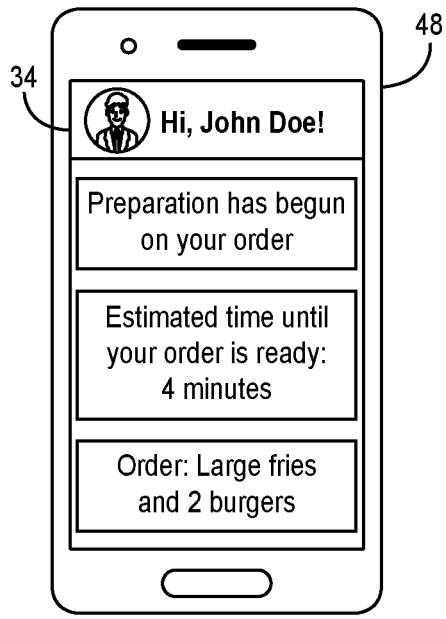
FIGS. 2A-2D are examples of the mobile application on the mobile phone of a customer.
Figure 2B:
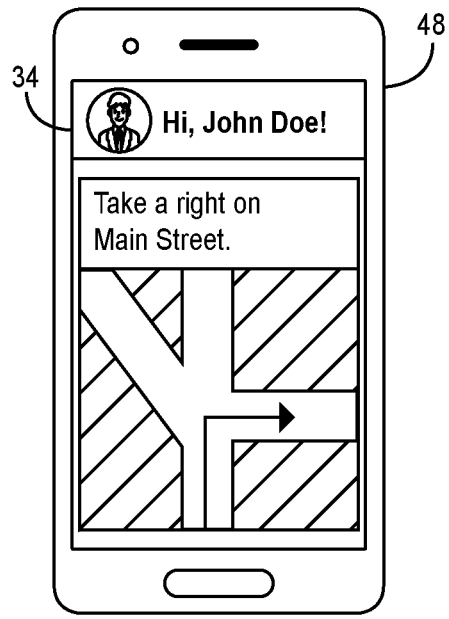
Figure 2C:
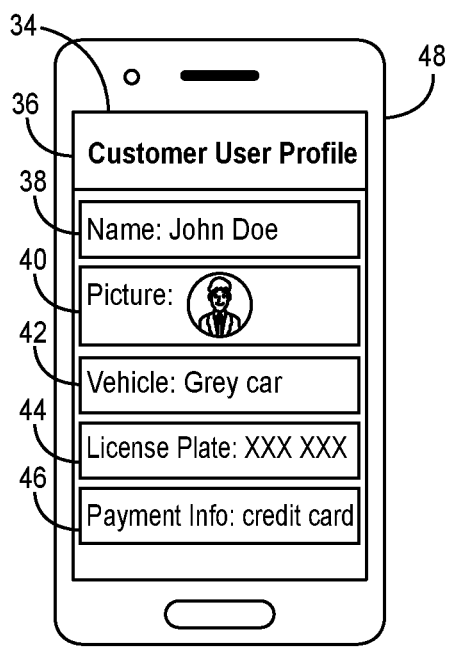
Figure 2D:
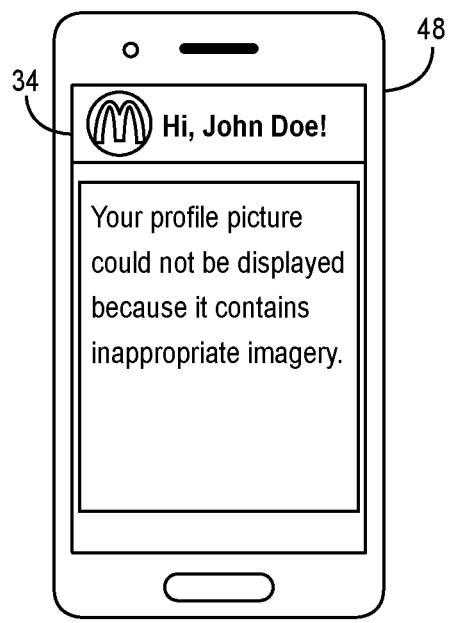

Customer user profile 36; which can be viewable and/or editable on mobile application 34 but otherwise can be stored on/in storage media 24 for access by customer 18, QSR 10, and/or system 20; is shown as an example in FIG. 2C. Customer user profile 36 can include a variety of information provided by customer 18 and/or collected by system 20. For example, customer user profile 36 can include customer name 38 (or another identifier for identifying customer 18 and/or customer user profile 36), customer picture 40 (which can be a picture of a face of customer 18 or another image provided by customer 18 and/or collected by system 20), customer vehicle information 42 (e.g., a make, model, color, and/or other information about vehicle 19 of customer 18), customer vehicle license plate information 44 (e.g., the license plate number and/or state of issuance of the license plate of vehicle 19), and/or payment information 46 (which can include a saved credit/debit card number or other payment methods that allow for customer 18 to remotely pay for orders). Customer user profile 36 can include some information that is accessible and/or editable by customer 18 and some information that is not accessible and/or editable by customer 18 and instead is collected/created by system 20 and associated with customer 18 for use in, among other things, identification and association of customer 18 with vehicle 19.

Mobile application 34 can provide notifications as to the display of customer name 38, customer picture 40, and/or other customer information on signs 30 (or that such information cannot be displayed on signs 30 and/or the reason that the information cannot be displayed on signs 30) as is described below with regards to FIG. 4.

Figure 4:
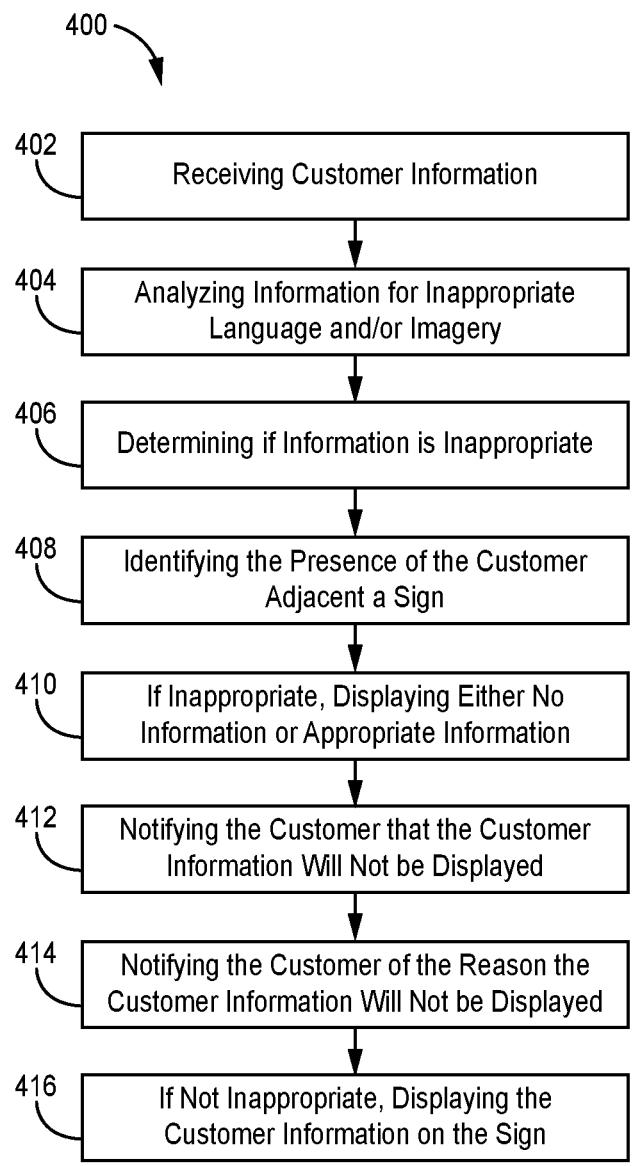
FIG. 4 is an example process or analyzing and determining whether information from a customer user profile includes inappropriate language and/or imagery and whether to display that information on a sign of the quick service restaurant.

FIG. 4 is an example process 400 of analyzing and determining whether information from customer user profile 36 includes inappropriate language and/or imagery and whether to display that information on any signs 30 of QSR 10. Process 400 is only one example, and other configurations can include fewer or more steps than those described herein. Additionally, the order of steps in process 400 can be different than that described herein, and process 400 can be combined wholly or in part with any of the other processes described in this disclosure, including processes 500-800. Processes 400-800 shown in FIGS. 4-8 can be performed by QSR 10 and/or system 20 or by other businesses and/or systems not expressly disclosed herein.

First, example process 400 of analyzing and determining whether customer information includes inappropriate language and/or imagery includes receiving customer information 402. Customers 18 can provide any information to customer user profile 36 (via mobile application 34 or other means, such as via a website of QSR 10), including customer name 38, customer picture 40, and other information. As described above, system 20 may display that customer information on one or multiple signs 30. However, system 20 may not wish to display customer information that is deemed to be inappropriate for viewing by others at QSR 10 or within view of signs 30.

Thus, second step 404 is analyzing the customer information for inappropriate language and/or imagery. Step 404 can be performed at any time before the display of the customer information on signs 30, including soon after customer 18 provides the customer information to customer user profile 36 and/or right before (or close to) when customer information is to be displayed by signs 30. Step 404 can be performed by computer processor 22 (e.g., machine-learning models 23) having optical character recognition or other capabilities for recognizing and determining if any of customer information is inappropriate. Additionally, step 404 can be performed by another system separate from system 20, such as a system at a corporate headquarters or a location where customer user profiles 36 are being stored, and that system can be specifically for the recognition of inappropriate customer information.

Third step 406 can include determining if the customer information is inappropriate. Third step 406 can be performed in conjunction with (e.g., at the same time as) second step 404, with the final determination of whether any of the customer information in customer user profile 36 is inappropriate. As with step 404, step 406 can be performed by system 20 (e.g., computer processor 22 with machine-learning model 23) or by another system. What is deemed as inappropriate language and/or imagery can be common inappropriate language and/or imagery, such as profanity, unsightly imagery, etc., but can also be language and/or imagery promoting or otherwise relating to other businesses and/or competitors of QSR 10. Additionally, inappropriate language and/or imagery can be that which is copyrighted or otherwise prevented from display for legal/liability reasons. Customer information that is sensitive (e.g., a phone number of customer 18) may also be deemed as inappropriate. For example, QSR 10 can be a McDonald's restaurant, and inappropriate language and/or imagery could be the term "Taco Bell" and any logos, branding, or images related to Taco Bell that those associated with QSR 10 do not wish to have displayed on signs 30. What constitutes inappropriate language and/or imagery can be selected and revised as desired.

Step 408 includes identifying the presence of customer 18 adjacent/near/in the light of sight of one or multiple signs 30 on which the customer information can be displayed. Step 408 can be performed at any time during process 400, and other configurations of process 400 can include step 408 being performed multiple times or not at all. With system 30 potentially including multiple signs 30, those signs can display different customer information related to different customers 18, so it may be necessary to identify the customer 18 that the display of particular sign 30 is to be directed at, otherwise customer 18 may not be able to view the relevant customer information directed at him/her. Step 408 can be performed by system 20 using a variety of components and/or processes described in this disclosure. If more than one customer 18 is identified, system 20 can select customer 18 that is closest to and/or more relevant to the one sign 30 and display customer information for that customer 18. In other configurations, signs 30 can display customer information for multiple customers 18.

Steps 410, 412, and 414 may not be performed in process 400 if the language and/or imagery is deemed not to be inappropriate (step 416), whereas step 416 may not be performed in process 400 if the language and/or imagery is deemed to be inappropriate (step 410). Step 410 includes displaying either no customer information or different, appropriate information if it is determined in step 406 that language and/or imagery is inappropriate. Only the particular language and/or imagery that is deemed inappropriate can be selected to not be displayed on signs 30. For example, if customer user profile 36 includes an image that is deemed inappropriate, the language (such as customer name 38) may still be displayed on signs 30. Similarly, in another example, if one word of customer name 38 (which may not be the customer's legal name) is deemed inappropriate, customer picture 40 and other language of customer name 38 may still be displayed on signs 30. Step 410 can include displaying no customer information (e.g., instead of "welcome, John Doe," signs 30 can simply display "welcome"). Alternatively, step 410 can include displaying different, appropriate information on signs 30. This information can be a logo, brand, and/or moto of QSR 10; a name and/or location of QSR 10; information related to the time-of-day, weather, or non-QSR 10 specific information, and/or other information related to QSR 10 (such as the hours of operation, etc.). FIG. 3B shows an example in which the name of QSR 10 is displayed (e.g., Restaurant 1) as well as a logo of QSR 10 (e.g., the McDonald's Golden Arch). The substitute information can be selected and revised by those associated with QSR 10 as desired.

If language and/or imagery is deemed inappropriate, step 412 can be performed by notifying customer 18 that the customer information will not be displayed on signs 30. The notice can be provided to customer 18 via mobile application 34 (shown in FIG. 2D), on signs 30 viewable by customer 18, or by other means. Similar to step 412, process 400 can include step 414, which is notifying customer 18 of the reason the customer information will not be displayed by signs 30. This reason can be taken from step 406 as to the determination that the customer information is inappropriate. For example, customer 18 can be notified that customer name 38 will not be displayed on signs 30 because it includes language related to a competitor of QSR 10. As with step 412, the notice in step 414 can be provided to customer 18 via mobile application 34, on signs 30, or by other means.

Process 400 can include step 416, which is displaying the customer information on signs 30 if step 406 determines that the customer information does not include inappropriate language and/or imagery. An example of signs 30 displaying the customer information for customer 18 (e.g., John Doe) is shown in FIGS. 1C, 2A, 2B, and 3A that display customer name 38 as well as customer picture 40. The display of customer information in step 416 can be on one or multiple signs 30, and can display the customer information on different signs 30 as customer 18 moves through/within parking lot 11. For example, customer information can be displayed for customer 18 (e.g., John Doe) at sign 30 at entrance/exit 15, then at sign 30 at the entrance to drive-through lane 13A, and then at signs 30 as customer 18 moves along drive-through lane 13A to the drive-through window. Finally, customer information, along with a thank you message, can be displayed at entrance/exit 15 as customer 18 leaves parking lot 11. When sign 30 is no longer viewable by customer 18, the customer information on that sign 30 can be turned off and/or switched so as to display customer information for a different customer 18.

Figure 5:
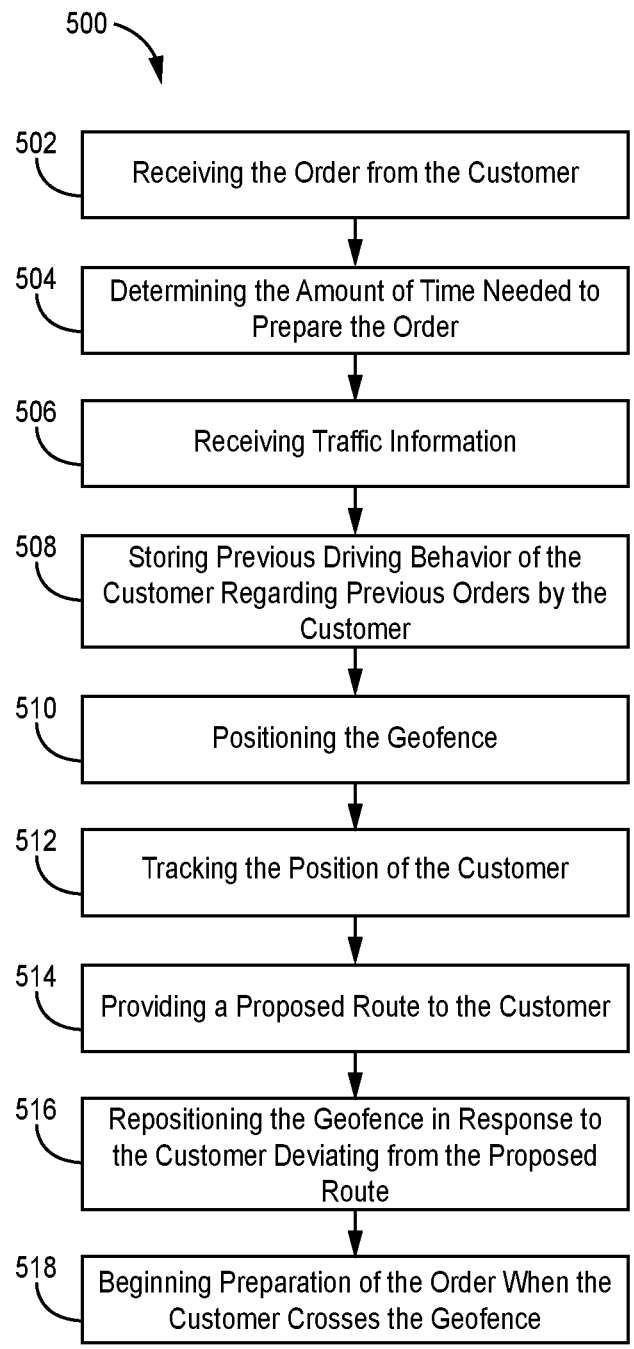
FIG. 5 is an example process for determining the placement of the geofence.

FIG. 5 is an example process 500 for determining the placement of geofence 32. Placement of geofence 32 determines when system 20 can begin preparation of an order placed by customer 18 distant from QSR 10 to ensure that the order is ready when customer 18 arrives at QSR 10 but is not prepared too far in advance so as to no longer be fresh when customer 18 arrives at QSR 10. As with process 400 above, process 500 is only one example, and other configurations can include fewer or more steps than those described herein. Additionally, the order of steps in process 500 can be different than that described herein, and process 500 can be combined wholly or in part with any of the other processes described this disclosure.

First, example process 500 for determining the placement of geofence 32 includes step 502, which is receiving the order from customer 18 distant from QSR 10. Customer 18 can place the order via mobile application 34, an online website for QSR 10, telephone to QSR 10, or by other means. The order can be placed at any location, and QSR 10 can receive the order from customer 18 when customer 18 is at any location. Other configurations in which QSR 10 is one of multiple franchisees of an overall company/franchise can automatically or prompt customer 18 to select the location of QSR 10 to which the order is to be placed (e.g., the order can automatically be placed at the QSR 10 that is closest geographically and/or timewise to customer 18).

Once the order is received by QSR 10 (e.g., by computer processor 22 in communication with customer 18 via mobile application 34), step 504 is performed by determining the amount of time needed to prepare the order. This can be performed as described above by various components of system 20, including computer processor 22 having machine-learning models 23. The determination in step 504 can conclude that the order will take a specific amount of time to prepare (e.g., 8 minutes).

Process 500 can include step 506, which includes receiving traffic information on roads 16 between customer 18 and QSR 10. Step 506 may require step 512 to be performed before step 506 so that the location of customer 18 is known such that the traffic information is for roads 16 between customer 18 and QSR 10. The traffic information can be determined by and received from an online maps website; such as Google Maps, Apple Maps, and Bing Maps; and can work in conjunction with location tracker 50 to determine the location of customer 18 and the surrounding traffic.

Additionally, process 500 can include step 508, which is recording and storing previous driving behavior of customer 18 relating to previous orders by customer 18. If customer 18 has previously ordered from QSR 10, system 20 can record and store the driving behavior of customer 18 on the way to QSR 10. The driving behavior can include at least one of the origin of customer 18 (i.e., the location at which customer 18 placed the order), the route customer 18 takes to get to QSR 10 from the origin, and an average time customer 18 takes to travel to QSR 10. The previous driving behavior can include other information, such as frequent stops made between the placement of the order and arrival at QSR 10.

Based upon at least one of the determination in step 504, the traffic information received in step 506, and the previous driving behavior stored in step 508, step 510 includes positioning the geofence 32 specific to customer 18 and the order by customer 18 (shown in FIG. 1B). The position of geofence 32 can be at a location such that the time it takes customer 18 to arrive at QSR 10 after crossing geofence 32 is approximately equal to the amount of time it takes QSR 10 to prepare the order. This ensures that the order is ready when customer 18 arrives at QSR 10 but also that the order is fresh and has not been sitting too long before customer 18 receives the order. Step 510, the positioning of geofence 32, can be dependent upon a variety of factors/inputs as described above with regards to geofence 32 and the prediction of the amount of time needed to prepare the order.

Step 512 of process 500 includes tracking the position of customer 18. As described above with regards to step 506, step 512 can be performed at any time during process 500 (including continuously throughout process 500) and may need to be performed prior to step 506. Step 512 can be performed by system 20 (e.g., location tracker 50 and/or other components), by an online maps website, or by other means. In step 512, if not being performed by system 20, the tracking information can be provided to system 20.

Process 500 can include step 514, which is providing proposed customer route 17A (shown in FIG. 1B) to customer 18 giving customer 18 directions on the determined quickest route to QSR 10. The quickest route can be determined by system 20, by an online maps website, or by other means. Proposed customer route 17A can be provided to customer 18 via mobile application 34, as is shown in FIG. 2B. Proposed customer route 17A can be updated as information changes and/or as customer 18 travels to QSR 10.

Step 516 of process 500 can include repositioning geofence 32 in response to customer 18 deviating from proposed customer route 17A and/or a change in information/inputs (e.g., traffic information, an update to the amount of time needed to prepare the order, etc.). The repositioned geofence 32 can change the location such that the time it takes customer 18 to arrive at QSR 10 after crossing geofence 32 remains approximately equal to the amount of time it takes QSR 10 to prepare the order. Step 516 may need to be performed before step 518 (before customer 18 crosses geofence 32), otherwise preparation of the order may have already been started by QSR 10. Customer 18 is not required to follow proposed customer route 17A and can instead take another route, shown in FIG. 1B as actual customer route 17B. Process 500 and system 20 can accommodate the differing actual customer route 17B by redetermining the amount of time it takes customer 18 to arrive at QSR 10 and changing geofence 32 and/or allocating the food items in the order to other orders by other customers 18.

Finally, process 500 can include beginning preparation of the order when customer 18 crosses geofence 32 so that the order is ready at approximately the same time customer 18 arrives at QSR 10 to pick up the order. Thus, the preparation of the order is optimized so as to not be ready too early (so that the order is no longer fresh when customer 18 receives it) while being ready to be picked up by customer 18 when customer 18 arrives at QSR 10. Process 500 can also include delivering the order to the customer at a location within parking lot 11 (e.g., at the drive-through window; at parking spots 12A, 12B, or 12C; or within QSR 10). Additionally, process 500 can also include notifying customer 18 that preparation has begun on the order after customer 18 has crossed geofence 32 and preparation has begun on the order (shown in FIG. 2A).

Figure 6:
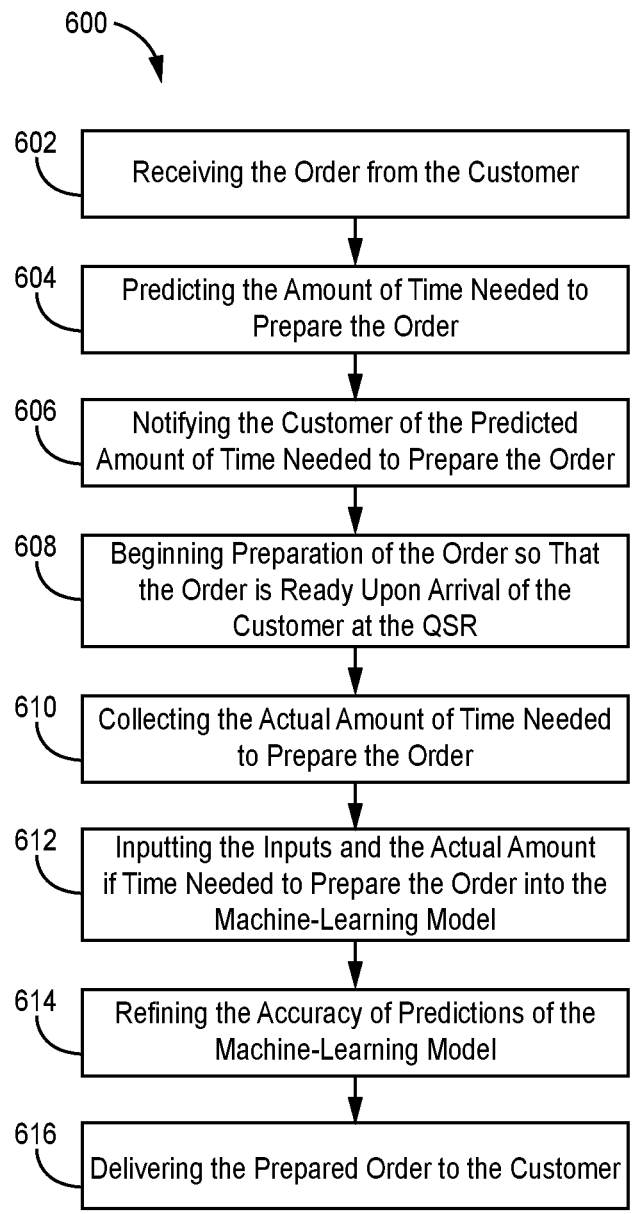
FIG. 6 is an example process for determining the amount of time needed to complete preparation of the order.

FIG. 6 is an example process 600 for determining the amount of time needed to complete preparation of the order by customer 18. Process 600 is only one example, and other configurations can include fewer or more steps than those described herein. Additionally, the order of steps in process 400 can be different than that described herein, and process 400 can be combined wholly or in part with any of the other processes described in this disclosure.

First, example process 600 for determining the amount of time needed to complete preparation of the order by customer 18 includes step 602, which is receiving the order from customer 18. Customer 18 can place the order distant from QSR 10, from within parking lot 11, from within QSR 10, and/or from another location. Customer 18 can place the order via mobile application 34, an online website for QSR 10, telephone to QSR 10, in person within QSR 10, or by other means. The order can be placed at any location, and QSR 10 can receive the order from customer 18 when customer 18 is at any location. Other configurations in which QSR 10 is one of multiple franchisees of an overall company/franchise can automatically or prompt customer 18 to select the location of QSR 10 to which the order is to be placed (e.g., the order can automatically be placed at the QSR 10 that is closest geographically and/or timewise to customer 18).

Process 600 includes step 604, which is predicting the amount of time needed to prepare the order placed by customer 18. This step can be performed by system 20 (e.g., computer processor 22 having machine-learning models 23). As described above, the prediction can depend upon a variety of inputs/factors, such as the at least one item in the order, a time-of-day that the order was placed by customer 18, a number of employees/staff members on duty at QSR 10, which employees/staff members are on duty at QSR 10, and a number of other orders currently pending at QSR 10. This information can be used to perform step 604, and can be collected by system 20 and/or other components/systems.

Process 600 can then include step 606, which is notifying customer 18 of the predicted amount of time needed to prepare the order (shown in FIG. 2A). The notification can be via mobile application 34, signs 30 viewable by customer 18, or by other means.

Step 608 includes beginning preparation of the order so that the order is ready upon arrival of customer 18 at QSR 10 (if the order is placed by customer 18 distant from QSR 10) or so that the order is ready as soon as possible (if the order is placed by customer 18 within parking lot 11 or within QSR 10). The order can include multiple food items that each require a certain amount of time to prepare, so the maximum time needed to prepare the order is dictated by the food item that takes the longest to prepare. Preparation of the order should be performed in such a way so that each food item of the order is fresh when preparation is complete and the order is delivered to customer 18.

Steps 610, 612, and 614 are directed to training machine-learning models 23 to refine the accuracy of the prediction of the amount of time needed to prepare the order. If machine-learning models 23 are not used in process 600, then process 600 may not include steps 610, 612, and/or 614. Step 610 includes collecting/recording the actual amount of time needed to prepare the order placed by customer 18. This is the output that machine-learning models 23 are aiming to predict, so the collection of this information is useful in training machine-learning models 23. The actual amount of time needed to prepare the order can be collected by system 20 and saved in, for example, storage media 24. The actual times for multiple orders can be recorded/collected and saved to provide more training opportunities for machine-learning models 23. Additionally, this information can be used in determining the efficiency of QSR 10 and for other purposes, such as staffing decisions, hours-of-operation decisions, etc. Next, step 612 is performed by inputting into machine-learning models 23 the inputs/factors used to predict the amount of time needed to prepare the order as well as the output/actual amount of time needed to prepare the order. With the inputs and outputs known, machine-learning models 23 can determine the inputs most indicative of predicting the outputs, as described earlier in this disclosure. This is performed in step 614 in which machine-learning models 23 use the inputs and outputs to refine the accuracy of the predictions of the time needed to prepare the orders.

Finally, process 600 include step 616, which is delivering the prepared order to customer 18. The order can be delivered to customer 18 anywhere within QSR 10 and/or within parking lot 11, such as at the delivery window (at the end of drive-through lanes 12A and 12B) or at one of parking spots 12A, 12B, and 12C.

Figure 7:
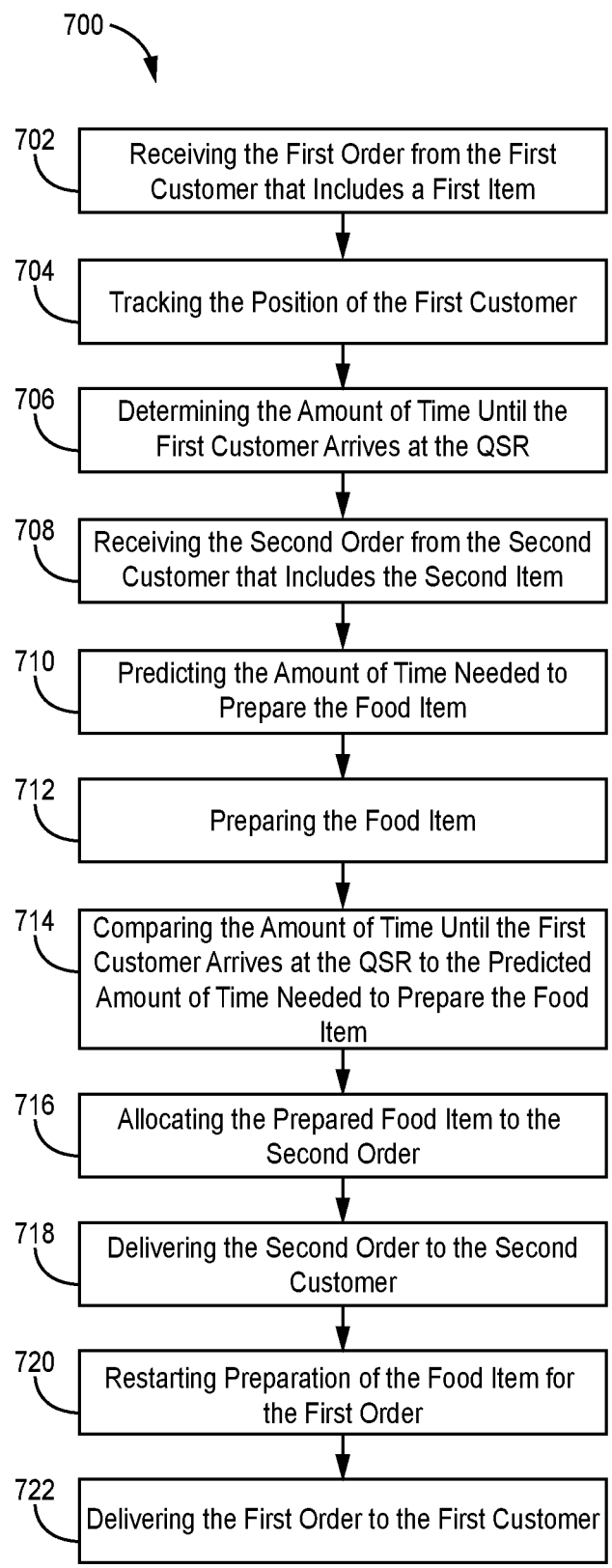
FIG. 7 is an example process for determining optimal order preparation, allocation, and delivery to customers.

FIG. 7 is an example process 700 for determining optimal order preparation, allocation, and delivery to customers 18. Process 700 is only one example, and other configurations can include fewer or more steps than those described herein. Additionally, the order of steps in process 700 can be different than that described herein, and process 700 can be combined wholly or in part with any of the other processes described in this disclosure.

First, example process 700 for determining optimal order preparation, allocation, and delivery to customers 18 includes step 702, which is receiving a first order from first customer 18 that includes a first food item in need of preparation. First customer 18 can place the order distant from QSR 10, from within parking lot 11, from within QSR 10, and/or from another location. First customer 18 can place the order via mobile application 34, an online website for QSR 10, telephone to QSR 10, in person within QSR 10, or by other means. The first order can be placed at any location, and QSR 10 can receive the first order from first customer 18 when first customer 18 is at any location. Other configurations in which QSR 10 is one of multiple franchisees of an overall company/franchise can automatically or prompt first customer 18 to select the location of QSR 10 to which the first order is to be placed (e.g., the first order can automatically be placed at the QSR 10 that is closest geographically and/or timewise to first customer 18).

Step 704 can include tracking the position of first customer 18. Step 704 can be performed at any time during process 700 (and/or can be performed continuously throughout process 700). Step 704 can be performed by system 20 (e.g., location tracker 50 and/or other components), by an online maps website, or by other means. In step 704, if not being performed by system 20, the tracking information can be provided to system 20.

From the tracking information collected in step 704, step 706 includes determining the amount of time until first customer 18 arrives as QSR 10 to pick up the first order. This determination depends on a variety of factors described above, including how far away first customer 18 is, actual customer route 17B first customer 18 takes to get to QSR 10, traffic information on roads 16 between first customer 18 and QSR 10, previous driving behavior of first customer 18, and other factors/information. Step 706 can include displaying or otherwise notifying employees/staff members of QSR 10 of the amount of time until first customer 18 arrives at QSR 10 and/or notifying first customer 18 (via mobile application 34 or other means) of the estimated time until first customer 18 arrives at QSR 10.

Next, process 700 includes step 708, which is receiving a second order from second customer 18 that includes a second food item in need of preparation. In this example, the second food item is the same type of item as the first food item (e.g., both are a large strawberry shake). Second customer 18 can place the second order distant from QSR 10, from within parking lot 11, from within QSR 10, and/or from another location. Second customer 18 can place the second order via mobile application 34, an online website for QSR 10, telephone to QSR 10, in person within QSR 10, or by other means. The second order can be placed at any location, and QSR 10 can receive the second order from second customer 18 when second customer 18B is at any location. Other configurations in which QSR 10 is one of multiple franchisees of an overall company/franchise can automatically or prompt second customer 18 to select the location of QSR 10 to which the second order is to be placed (e.g., the second order can automatically be placed at the QSR 10 that is closest geographically and/or timewise to second customer 18). However, in this example, the second order is placed at the same QSR 10 as the first order. The first order can include other food items aside from the first food item, and the second order can include other food items aside from the second food item. However, process 700 is directed at the allocation of food items to different orders, so in this example the first and second orders both include at least one of the same food items.

Step 710 includes predicting the amount of time needed to prepare the first/second food item (which is the same food item as described above) placed by first and second customers 18. This predicted amount of time should be the same for the first food item and the second food item because they are the same item. This step can be performed by system 20 (e.g., computer processor 22 having machine-learning models 23). As described above, the prediction can depend upon a variety of inputs/factors, such as the at least one item in the order, a time-of-day that the order was placed by first and second customers 18, respectively, a number of employees/ staff members on duty at QSR 10, which employees/staff members are on duty at QSR 10, and a number of other orders currently pending at QSR 10 (aside from the first order and the second order). This information can be used to perform step 710 and can be collected by system 20 and/or other components/systems.

Step 712 includes preparing the first/second food item. Step 712 can be performed directly after step 704 (receiving the first order that includes the first food item) or can be performed any time during process 700. The first/second food item can be prepared partially or completely by an automated system within QSR 10 and/or by employees/staff members of QSR 10. The instruction to perform step 712 (prepare the first/second food item) can be provided by system 20, and system 20 can determine at what point in time to give that instruction. Step 712 can include retrieving ingredients for the food item, combining the ingredients, cooking the items/ingredients, assembling the components of the food item, and/or other steps.

Step 714 of process 700 includes comparing the amount of time until first customer 18 arrives at QSR 10 determined in step 706 to the predicted amount of time needed to prepare the first/second food item determined in step 710. The comparison can results in three outcomes: 1) the amount of time until first customer arrives at QSR 10 can be greater than the predicted amount of time needed to prepare the food item; 2) the amount of time until first customer 18 arrives at QSR 10 can be equal to the predicted amount of time needed to prepare the food item; and 3) the amount of time until first customer 18 arrives at QSR 10 can be less than the predicted amount of time needed to prepare the food item. For the first two outcomes, there is enough time to remake the first food item for the first order by first customer 18, so process 700 can perform step 716, which is allocating the prepared first/second food item to the second order for second customer 18. For the third outcome, there is not enough time to remake the first food item for the first order by first customer 18, so step 722 can be performed, which is allocating the food item to the first order and delivering the food item in the first order to first customer 18.

Step 716, allocating the prepared first/second food item to the second order, can be performed if second customer 18 is at QSR 10 or will arrive at QSR 10 before first customer 18 such that second customer 18 will be ready to receive his/her order before first customer 18 is ready to receive his/her order. To reduce the amount of time second customer 18 waits for the second order while also not increasing the amount of time first customer 18 waits for the first order, process 700 can allocate the first/second food item to the second order so that the second order can be delivered to second customer 18. The decision to perform step 716 can be determined by system 20, including computer processor 22 and/or machine-learning models 23. If step 716 is performed, the allocation of the first/second food item can be communicated to QSR 10 (an automated system and/or employees/staff members) via signs 30 within QSR 10, via wired or wireless communication with a food preparation system in QSR 10, or by other means. Other configurations of process 700 can include performing step 716 even in outcome three above (where first customer 18 will arrive at QSR 10 while the food item is being remade). In this situation, process 700 can perform step 716 when the total amount of time waiting for their orders by first and second customer 18 is less if the food item is allocated to the second order than if the food item is prepared for the second order afresh without allocation. In this example, first customer 18 may have to wait for his/her order, but second customer 18 may not have to wait for his/her order or may have to wait a lot shorter of a time compared to if the food item was made afresh from when the second order was placed by second customer 18. Other configurations of process 700 can include other determinations as to whether to allocate the prepared first/second food item to the second order for second customer 18 or to keep first/second food item part of the first order for first customer 18. For example, system 20 and/or process 700 can prioritize customers 18 that are loyalty customers and make determinations for allocation of food items to reduce the amount of wait time for loyalty customers.

If step 716 is performed and the first/second food item is allocated to the second order, step 718 is performed in that the second order is delivered to second customer 18. The second order can be delivered to second customer 18 anywhere within QSR 10 and/or within parking lot 11, such as at the delivery window (at the end of drive-through lanes 12A and 12B) or at one of parking spots 12A, 12B, and 12C.

If step 716 is performed and the first/second food item is allocated to the second order, step 720 is performed in that preparation is restarted on the first food item for the first order. The first food item can be prepared partially or completely by an automated system within QSR 10 and/or by employees/staff members of QSR 10. The instruction to perform step 720 (prepare the first/second food item) can be provided by system 20, and system 20 can determine at what point in time to give that instruction. Step 720 can include retrieving ingredients for the food item, combining the ingredients, cooking the items/ingredients, assembling the components of the food item, and/or other steps.

Finally, process 700 includes step 722, which is delivering the first order to first customer 18. Step 722 can be performed any time after the first/second food item is prepared if step 716 is not to be performed in process 700. If the situation warrants that step 716 is not to be performed in process 700, then step 720 can include preparing the second food item for the second order (as opposed to preparing the first food item for the first order). In other examples/configurations, process 700 can include less than all of steps 702-722 and/or can include steps that are performed in an order that is different than that described herein. Additionally, while some steps of process 700 are described with regards to first food item, second food item, first order, or second order, those steps may be performed for any of the food items and/or orders by customers 18.

Figure 8:
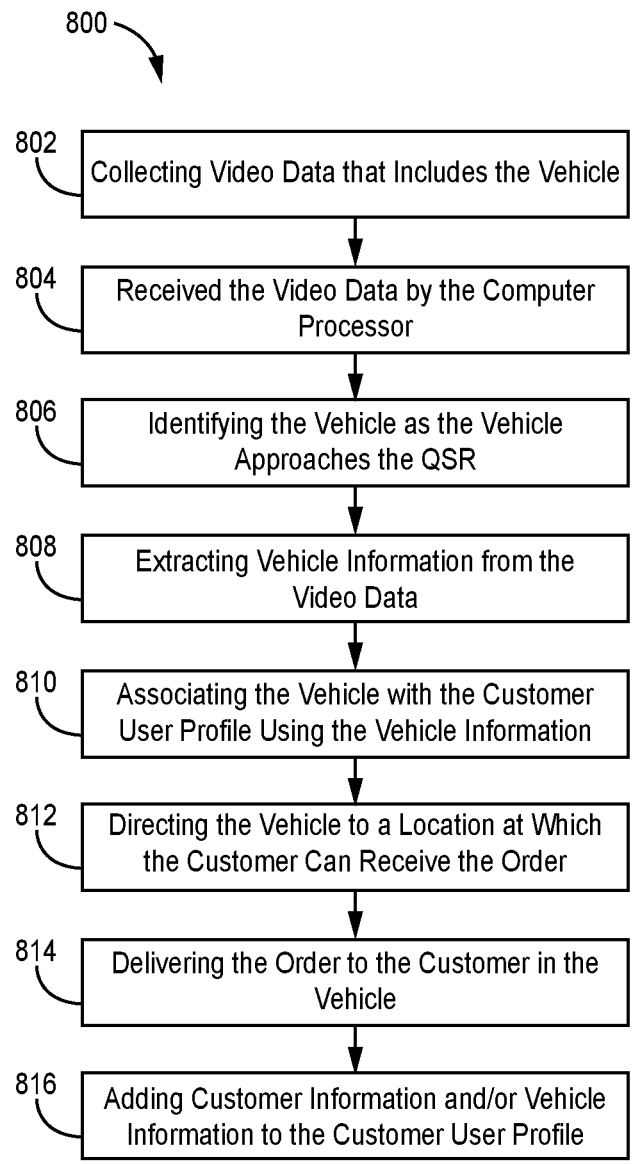
FIG. 8 is an example process for identifying a vehicle and associating the vehicle with a customer.

FIG. 8 is an example process 800 for identifying vehicle 19 and associating vehicle 19 with customer 18. Process 800 is only one example, and other configurations can include fewer or more steps than those described herein. Additionally, the order of steps in process 800 can be different than that described herein, and process 800 can be combined wholly or in part with any of the other processes described in this disclosure.

The first step of process 800 can include step 802, which is collecting video data that includes vehicle 19. As described above, video data can be collected by one or multiple cameras 26 that collect video data of customer 18 and/or vehicle 19 near or within parking lot 11. Cameras 26 can be pointed at, for example, entrances/exits 15 to collect video data that includes vehicle 19 as vehicle 19 enters parking lot 11. System 20 can have other components, configurations, and/or capabilities for collecting video data.

Then, step 804 includes receiving the video data by computer processor 22. Cameras 26 can be in wired or wireless communication with computer processor 22 to transmit the video data to computer processor 22. In this example, the video data is received by computer processor 22 instantaneously or very soon after being recorded/captured/collected by cameras 26 so that computer processor 22 can identify and/or extract information from the video data and use that information for optimizing the food preparation and delivery to customer 18.

Process 800 can include step 806, which is identifying vehicle 19 from the video data as vehicle 19 approaches QSR 10 (e.g., approaches and/or enters parking lot 11). Step 806 can be performed by computer processor 22, which can have computer vision and/or optical character recognition for recognizing vehicle 19 within the video data, or by another component of system 20 (or by another system). Step 806 can be performed by analyzing each frame of the video data to determine if any of the frames include vehicle 19. Step 806 can also include highlighting or otherwise noting/saving those frames that include vehicle 19 for use in step 808.

Step 808 includes extracting vehicle information from the video data. Step 808 can be performed by computer processor 22 of system 20, which can include using computer vision, optical character recognition, and/or machine-learning models 23. The extraction of the vehicle information can include recognizing and recording information specific to vehicle 19, such as the vehicle make, model, and color; the vehicle license plate number and state of issuance; and/or any other identifying information.

After the vehicle information is extracted/collected, step 810 includes using the vehicle information to associate vehicle 19 with customer 18 via customer user profile 36. Customer use profile 36, as described above, can include customer vehicle information 42 and/or customer vehicle license plate information 44 either provided by customer 18 or added to customer user profile 36 by system 20. Step 810 includes comparing the collected vehicle information to the information in customer user profile 36. If the information matches, vehicle 19 is associated with customer 18 having customer user profile 36. Once customer 18 is known, the order placed by customer 18 is also known and QSR 10 can take the necessary actions to optimize the preparation and delivery of the order as well as to optimize directing vehicle 19 within parking lot 11 to collect the order.

Step 810, associating the vehicle information with customer 18, can be performed using other methods as described above. For example, the location of customer 18 can be determined using mobile application 34 on customer mobile phone 48 in conjunction with cameras 26, beacons 28, and/or location tracker 50 with the location of customer 18 being compared to the location of vehicle 19. If the two locations are the same, then it can be determined that customer 18 is within vehicle 19 and the two are associated with one another and with customer user profile 36. Step 810 can be performed by system 20 (e.g., computer processor 22) or another system within, near, or distant from QSR 10.

After vehicle 19 has been associated with customer 18 and the order by customer 18, process 800 includes step 812 of directing vehicle 19 to a location at which customer 18 can receive the order. Step 812 can direct vehicle 19 to any location within parking lot 11, such as parking spots 12A, 12B, and 12C; drive-through lanes 13A and 13B; and general parking spots 14. System 20 can be aware of where vehicle 19 is located and convey that information to QSR 10 so QSR 10 (e.g., employees/staff members) knows to what location to deliver the order. Step 812 can be performed such that vehicle 19 is directed to a location at which customer 18 will have to wait the least amount of time to receive his/her order. This optimal management/direction of vehicles 19 can be determined by computer processor 22 (potentially having machine-learning models 23). Directing vehicle 19 can be performed by notifying customer 18 via a notice on mobile application 34 (shown in FIG. 1C), by a message and/or arrows on signs 30 (shown in FIGS. 3A and 3B), and/or by other means, such as an audible message/notice.

After vehicle 19 associated with customer 18 is at the specified location directed by step 812, step 814 is performed by delivering the order to customer 18 in vehicle 19 (or prompting customer 18 to proceed on foot into QSR 10 to collect/receive the order). The order can be delivered to customer 18 anywhere within QSR 10 and/or within parking lot 11, such as at the delivery window (at the end of drive-through lanes 12A and 12B) or at one of parking spots 12A, 12B, and 12C.

At any time during process 800, step 816 can be performed by adding customer information and/or vehicle information to customer user profile 36 for later use by process 800 and/or system 20 for associating vehicle 19 with customer 18. The customer information and/or vehicle information can include any information specific to customer 18 and/or vehicle 19, such as the food items in the order placed by customer 18, the wait time customer 18 experienced before receiving the order, payment information used by customer 18 to pay for the order, the location of QSR 10 at which customer 18 placed the order, customer vehicle information 42, customer vehicle license plate information 44 and/or license plate state of issuance, customer picture 40 collected by cameras 26, customer name 38 collected from the order, the amount of time customer 18 took to collect the order after being presented with the order (e.g., the amount of time customer 18 sat at the delivery window after being given the order but before driving off in vehicle 19), and/or any other information. This information can be used by process 800 and/or system 20 to better optimize/reduce the amount of wait time by any of customers 18.

System 20 can be configured to direct customers 18 in vehicles 19 that have yet to place an order into one of drive-through lanes 13A and 13B depending on if customer 18 is a loyalty or nonloyalty customer, which can be determined by whether customer 18 has signed up for customer user profile 36. System 20 can be configured to prioritize loyalty customers by directing loyalty customers into a drive-through lane (drive-through lane 13B in FIG. 1C) in which the estimated wait time is less than the other drive-through lane.

System 20 can pair with loyalty programs/ordering in mobile application 34 and QSR 10 order fulfillment system to detect when customer 18 is approaching QSR 10 and then identify their place in parking lot 11 to ensure customer 18 drives up, receives the order, and drives away with a minimal amount of waiting, maximum accuracy, and improved customer satisfaction.

System 20 can provide loyalty integration by encouraging customers 18 to use mobile application 34 for shorter wait times and higher convenience, a virtual agent to allow voice ordering, geofence 32 to identify when customer 18 is approaching to start preparation of the order, and location tracking to determine when/where customer 18 is in the zone surrounding QSR 10 (to deliver customer 18 the correct order quickly and efficiently.

Discussion of Possible Embodiments

The following are nonlimiting examples of the system and related processes for customer management and order preparation and delivery optimization:

A method of preparing an order placed by a customer distant from a quick service restaurant can include receiving, from the customer, an order that includes at least one food item in need of preparation; determining, by a computer processor, an amount of time needed to prepare the at least one food item; positioning, dependent upon the amount of time needed to prepare the at least one food item, a geofence around the quick service restaurant; tracking a position of the customer; and, in response to the customer crossing the geofence, beginning preparation of the at least one food item.

The method can further include that the positioning of the geofence is further dependent upon traffic on roads between the customer and the quick service restaurant.

The method can further include that the positioning of the geofence is further dependent upon previous driving behavior of the customer.

The method can further include that the positioning of the geofence is further dependent upon a route the customer is traveling to get to the quick service restaurant.

The method can further include that positioning of the geofence is further dependent upon a number of pending orders at the quick service restaurant.

A method of predicting an amount of time needed to complete preparation of an order at a quick service restaurant can include receiving, from a customer, the order that includes at least one food item in need of preparation and predicting, by a machine-learning model, the amount of time needed to complete preparation of the order based on the at least one food item that was ordered and based on at least one of the following: a time-of-day that the order was placed, a number of employees on duty at the quick service restaurant, a number of other orders currently pending at the quick service restaurant, and inventory of each ingredient needed to complete preparation of the at least one food item.

The method can further include collecting an actual amount of time needed to complete preparation of the order and/or inputting into the machine-learning model the actual amount of time needed to complete preparation of the order, the prediction of the amount of time needed to complete preparation of the order, and/or the information the prediction was based upon to refine the predictive abilities of the machine-learning model.

A method of preparing orders of food items at a quick service restaurant can include receiving, from a first customer distant from the quick service restaurant, a first order that includes a first food item in need of preparation; tracking a position of the first customer; determining, based on the position of the first customer, how long it will take the first customer to reach the quick service restaurant to retrieve the first order; receiving, from a second customer, a second order that includes a second food item that is the same as the first food item; determining, by a computer processor, an amount of time needed to prepare the first food item; preparing the first food item; and allocating, depending on how long it will take the first customer to reach the quick service restaurant, the prepared first food item to the second order and restarting preparation of the first food item for the first customer.

A method of detecting inappropriate imagery in a customer user profile image intending to be displayed on digital signage at a quick service restaurant can include identifying the presence of a customer adjacent a digital sign; associating the customer with a profile of the customer; analyzing, by a computer processor, the customer user profile image for inappropriate imagery in the customer user profile image; if inappropriate imagery is detected, displaying on the digital sign either no image or a different image that does not contain inappropriate imagery; and if inappropriate imagery is not detected, displaying on the digital sign the customer user profile image.

The method can further include, if inappropriate imagery is detected, notifying the customer of the reason for not displaying the customer user profile image.

The method can further include that the different image displayed on the digital sign that does not contain inappropriate imagery is a logo of the quick service restaurant.

The method can further include that the computer processor uses optical character recognition to analyze the customer user profile image for inappropriate imagery.

The method can further include that the inappropriate imagery is a profane word in the customer user profile image.

The method can further include that the inappropriate imagery is a logo of a competitor of the quick service restaurant.

A method of delivering an order to a customer of a quick service restaurant can include identifying, by computer vision using at least one camera, a vehicle that enters a zone surrounding the quick service restaurant; associating, by a computer processor, the vehicle with a profile of the customer that includes the order; directing the vehicle to a location within the zone; and delivering the order to the customer in the vehicle.

The method can further include that the vehicle is identified by a license plate.

The method can further include that vehicle is directed to the location dependent upon whether the customer is a loyalty customer.

The method can further include that the location within the zone the vehicle is directed to is a waiting spot.

The method can further include that the at least one camera is pointed at an entrance to the zone.

The method can further include that the vehicle is directed to the location to reduce the amount of time the customer waits to receive the order based upon a determination by a machine-learning model.

A method of delivering an order to a customer of a quick service restaurant can include transmitting, from a first beacon to a receiver adjacent the customer, a first signal; transmitting, from a second beacon to the receiver adjacent the customer, a second signal; from the first signal received by the receiver, a first timestamp reflective of a time the first signal is received by the receiver, the second signal received by the receiver, and a second timestamp reflective of a time the second signal is received by the receiver, determining a location of the customer within a zone surrounding the quick service restaurant; communicating the location of the customer to a display within the quick service restaurant; and delivering the order to the customer at the location.

The method can further include that the receiver is a mobile phone.

The method can further include that the first beacon and the second beacon are each Bluetooth low-energy beacons.

The method can further include that the first beacon is adjacent a first waiting spot and the second beacon is adjacent a second waiting spot and the location of the customer is within either the first waiting spot or the second waiting spot, and wherein the step of communicating the location of the customer to a display includes communicating that the customer is within one of the first waiting spot and the second waiting spot.

The method can further include that the first signal and the second signal are each a unique signal with a configurable cadence.

The method can further include wirelessly communicating the first signal, the first timestamp, the second signal, and the second timestamp from the receiver to a computer processor.

The method can further include that the determination of the location of the customer is performed by the computer processor.

The method can further include that the zone is a parking lot surrounding the quick service restaurant.

A method of delivering an order to a customer of a quick service restaurant can include identifying a vehicle of the customer that enters a zone surrounding the quick service restaurant and displaying, on at least one digital sign able to be viewed by the customer, information specific to the customer.

The method can further include that the vehicle is identified using cameras and computer vision.

The method can further include that the vehicle is identified using GPS tracking of a mobile phone of the customer.

The method can further include that the vehicle is identified using Bluetooth signals received by a mobile phone of the customer.

The method can further include that the information specific to the customer displayed by the digital sign includes a suggested order for the customer.

The method can further include that the suggested order for the customer is dependent upon previous orders by the customer.

The method can further include that the suggested order for the customer is dependent upon the order by the customer.

The method can further include that the information specific to the customer displayed by the digital sign includes an estimated wait time until the customer receives the order.

The method can further include that the information specific to the customer displayed by the digital sign includes directions for directing the customer into either a drive-through lane or a waiting spot.

The method can further include that the directions for directing the customer into either a drive-through lane or a waiting spot are dependent upon at least one of: 1) whether the customer is a member of a loyalty program, 2) an estimate wait time until delivery of the order, and 3) whether the customer placed the order in advance of arriving at the quick service restaurant.

The method can further include that the directions displayed by the digital sign change dependent upon any changes to the order made by the customer.

The method can further include that the customer makes changes to the order via an application on a mobile phone of the customer.

The method can further include that the information specific to the customer displayed by the digital sign includes a list of the items in the order.

A method of delivering an order to a customer of a quick service restaurant can include receiving, from the customer, an order that includes at least one food time in need of preparation; determining, by a computer processor, an amount of time needed to prepare the at least one food item; identifying a vehicle of the customer that enters a zone surrounding the quick service restaurant; depending on when the vehicle is identified within the zone as compared to an amount of time needed to complete preparation of the at least one food item, directing the customer to either at least one drive-through lane or a waiting spot; and delivering the order to the customer either in the at least one drive-through lane or at the waiting spot.

The method can further include that the customer is directed to either the at least one drive-through lane or the waiting spot depending upon the number of vehicles in the drive-through lane.

The method can further include that the at least one drive-through lane includes a first drive-through lane for loyalty customers and a second drive-through lane for nonloyalty customers.

The method can further include directing the customer to the first drive-through lane if the customer is a loyalty customer and directing the customer to the second drive-through lane if the customer is a nonloyalty customer.

The method can further include directing nonloyalty customers to the first drive-through lane in response to an increased estimated wait time for customers in the second drive-through lane.

The method can further include that the customer is directed to the waiting spot in response to the amount of time needed to complete preparation of the at least one food item being greater than three minutes.

The method can further include that the customer is directed to the at least one drive-through lane in response to the amount of time needed to complete preparation of the at least one food item being less than three minutes.

The method can further include that the customer is directed to either the at least one drive-through lane or the waiting spot using a digital display adjacent an entrance to the zone surrounding the quick service restaurant.

The method can further include that the customer is directed to either the at least one drive-through lane or the waiting spot depending upon a past average service time of the customer.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of detecting inappropriate imagery in a customer user profile image intending to be displayed on a digital sign, the method comprising:

receiving customer information including the customer user profile image;
analyzing, by a computer processor, the customer user profile image for inappropriate imagery;
in response to the detection of inappropriate imagery, displaying on the digital sign one of no image and a different image that does not contain inappropriate imagery;
analyzing, by the computer processor, all text in the customer information for inappropriate language;
in response to the detection of inappropriate language, displaying on the digital sign imagery or a name of a business associated with the digital sign;
in response to the determination that the customer information contains no inappropriate language, displaying at least a portion of the customer information on the digital sign; and
in response to the determination that the customer user profile image contains no inappropriate imagery, displaying the customer user profile image on the digital sign.

2. The method of claim 1, wherein the at least a portion of the customer information that is displayed on the digital sign is a customer user profile name.

3. The method of claim 1, wherein the digital sign is associated with a quick service restaurant, and the method further comprises:
identifying the presence of the customer adjacent the digital sign.

4. The method of claim 1, wherein inappropriate imagery is a logo of a competitor of a business associated with the digital sign.

5. The method of claim 1, wherein the different image to be displayed when the customer user profile image contains inappropriate imagery is a logo of a business associated with the digital sign.

6. The method of claim 1, further comprising:
in response to the detection of inappropriate imagery, notifying the customer that the customer user profile image will not be displayed.

7. The method of claim 1, further comprising:
in response to the detection of inappropriate imagery, notifying the customer of a reason for not displaying the customer user profile image.

8. The method of claim 1, wherein the computer processor uses optical character recognition to analyze the customer user profile image for inappropriate imagery.

9. The method of claim 1, wherein the computer processor includes a machine learning model.

10. The method of claim 9, further comprising:
providing the customer information and the determination that the customer user profile image does or does not include inappropriate imagery to the machine learning model for training of the machine learning model.

11. The method of claim 1, wherein the digital sign is associated with a quick service restaurant and the method further comprises:
identifying the customer as the customer enters a parking lot of the quick service restaurant; and
displaying the customer user profile image, in response to the determination that the customer user profile image contains no inappropriate imagery, on the digital sign that is pointed at the entrance.

12. The method of claim 1, wherein the digital sign is associated with a quick service restaurant and the method further comprises:
identifying the customer as the customer enters a parking space of the quick service restaurant; and
displaying the customer user profile image, in response to the determination that the customer user profile image contains no inappropriate imagery, on the digital sign that is associated with the parking space.

13. A system for detecting inappropriate imagery, the system comprising:
a digital sign associated with a business and configured to display a customer user profile image;
customer information that includes the customer user profile image provided by a customer associated with the customer information; and
a computer processor configured to:
receive the customer information;
analyze the customer user profile image for inappropriate imagery;
in response to the detection of inappropriate imagery in the customer user profile image, instruct the digital sign to display one of no image and a different image that does not contain inappropriate imagery;
analyze all text in the customer information for inappropriate language;
in response to the detection of inappropriate language, instruct the digital sign to display imagery or a name of a business associated with the digital sign;
in response to the determination that the customer information contains no inappropriate language, instruct the digital sign to display at least a portion of the customer information on the digital sign; and
in response to a determination that the customer user profile image contains no inappropriate imagery, instruct the digital sign to display the customer user profile image.

14. The system of claim 13, further comprising:
storage media associated with the computer processor and configured to store at least one of the customer information and instructions for the digital sign.

15. The system of claim 13, wherein the business is a quick service restaurant and the digital sign is located adjacent a parking space in a parking lot of the quick service restaurant.

16. The system of claim 13, wherein the computer processor includes a machine learning model for analyzing the customer user profile image for inappropriate imagery.

17. The system of claim 13, further comprising:
a mobile application associated with the business to which the customer provides the customer information and from which the computer processor receives the customer information.

18. The system of claim 13, further comprising:
a location tracker configured to determine when the customer is within a zone to which the digital sign is directed,
wherein the computer processor receives the customer information when the location tracker determines the customer is within the zone.

* * * * *